United States Patent
Handa et al.

(10) Patent No.: US 12,202,147 B2
(45) Date of Patent: Jan. 21, 2025

(54) NEURAL NETWORKS TO GENERATE ROBOTIC TASK DEMONSTRATIONS

(71) Applicant: NVIDIA CORPORATION, Santa Clara, CA (US)

(72) Inventors: Ankur Handa, Seattle, WA (US); Iretiayo Akinola, Seattle, WA (US); Dieter Fox, Seattle, WA (US); Yashraj Shyam Narang, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 233 days.

(21) Appl. No.: 17/695,756

(22) Filed: Mar. 15, 2022

(65) Prior Publication Data
US 2023/0191605 A1 Jun. 22, 2023

Related U.S. Application Data
(60) Provisional application No. 63/291,205, filed on Dec. 17, 2021.

(51) Int. Cl.
B25J 9/16 (2006.01)

(52) U.S. Cl.
CPC ............ *B25J 9/1671* (2013.01); *B25J 9/161* (2013.01); *B25J 9/163* (2013.01); *B25J 9/1689* (2013.01)

(58) Field of Classification Search
CPC . B25J 9/1671; B25J 9/161; B25J 9/163; B25J 9/1689; G05B 2219/36422;
(Continued)

(56) References Cited

U.S. PATENT DOCUMENTS 5,046,022 A * 9/1991 Conway ................. B25J 9/1689
700/250
5,774,632 A 6/1998 Kaske
(Continued)

FOREIGN PATENT DOCUMENTS

DE 4440859 C2 8/1998
DE 102021103272 A1 8/2021

OTHER PUBLICATIONS

Allshire et al., "Transferring Dexterous Manipulation from GPU Simulation to a Remote Real-World Trifinger", arXiv:2108.09779, Aug. 22, 2021, 13 pages.
(Continued)

*Primary Examiner* — Bhavesh V Amin
(74) *Attorney, Agent, or Firm* — Artegis Law Group, LLP

(57) ABSTRACT

A technique for training a neural network, including generating a plurality of input vectors based on a first plurality of task demonstrations associated with a first robot performing a first task in a simulated environment, wherein each input vector included in the plurality of input vectors specifies a sequence of poses of an end-effector of the first robot, and training the neural network to generate a plurality of output vectors based on the plurality of input vectors. Another technique for generating a task demonstration, including generating a simulated environment that includes a robot and at least one object, causing the robot to at least partially perform a task associated with the at least one object within the simulated environment based on a first output vector generated by a trained neural network, and recording demonstration data of the robot at least partially performing the task within the simulated environment.

20 Claims, 10 Drawing Sheets

(58) Field of Classification Search
CPC ........... G05B 2219/39271; G05B 2219/40121; G05B 19/42
See application file for complete search history.

(56) References Cited

U.S. PATENT DOCUMENTS

| | | | | |
|---|---|---|---|---|
| 8,441,454 | B2* | 5/2013 | Longe | G06F 3/0237 345/173 |
| 10,387,804 | B2* | 8/2019 | Werth | G06N 20/20 |
| 10,611,026 | B1 | 4/2020 | Sun et al. | |
| 10,733,502 | B2* | 8/2020 | Nachum | G06N 3/092 |
| 10,981,272 | B1* | 4/2021 | Nagarajan | B25J 9/1669 |
| 11,429,844 | B2* | 8/2022 | Nachum | G06N 3/092 |
| 11,904,469 | B2* | 2/2024 | Tsuda | B25J 13/088 |
| 2008/0011904 | A1* | 1/2008 | Cepollina | B64G 1/2427 244/172.6 |
| 2009/0164397 | A1* | 6/2009 | Kwok | G06N 3/004 382/160 |
| 2009/0234788 | A1* | 9/2009 | Kwok | G06N 3/006 718/1 |
| 2012/0215348 | A1* | 8/2012 | Skrinde | B25J 9/163 701/2 |
| 2016/0092779 | A1* | 3/2016 | Werth | G06N 20/10 706/48 |
| 2017/0108236 | A1* | 4/2017 | Guan | G05B 19/042 |
| 2018/0126553 | A1* | 5/2018 | Corkum | B25J 9/1697 |
| 2018/0284758 | A1* | 10/2018 | Cella | H04L 1/18 |
| 2018/0345496 | A1* | 12/2018 | Li | B25J 9/161 |
| 2019/0138967 | A1* | 5/2019 | Akella | G06F 16/2228 |
| 2019/0143517 | A1* | 5/2019 | Yang | G06N 5/046 700/245 |
| 2019/0197396 | A1* | 6/2019 | Rajkumar | B25J 9/1671 |
| 2019/0202053 | A1* | 7/2019 | Tan | B25J 9/1664 |
| 2019/0291277 | A1* | 9/2019 | Oleynik | B25J 9/1669 |
| 2019/0332922 | A1* | 10/2019 | Nachum | G06N 3/08 |
| 2020/0086482 | A1* | 3/2020 | Johnson | A47J 44/00 |
| 2020/0101599 | A1* | 4/2020 | Yoshida | B25J 9/1697 |
| 2020/0320372 | A1* | 10/2020 | Nachum | G06N 3/08 |
| 2020/0327399 | A1 | 10/2020 | Silver et al. | |
| 2021/0205988 | A1 | 7/2021 | James et al. | |
| 2021/0252698 | A1 | 8/2021 | Paxton et al. | |
| 2021/0362328 | A1 | 11/2021 | Kolluri et al. | |
| 2023/0191605 | A1* | 6/2023 | Handa | B25J 9/161 700/257 |
| 2023/0330846 | A1* | 10/2023 | Zhou | G06N 3/084 |

OTHER PUBLICATIONS

Argall et al., "A Survey of Robot Learning from Demonstration", doi: 10.1016/j.robot.2008.10.024, Robotics and Autonomous Systems, vol. 57, Nov. 25, 2009, pp. 469-483.
Zhang et al., "Deep Imitation Learning for Complex Manipulation Tasks from Virtual Reality Teleoperation", IEEE, arXiv:1710.04615, Mar. 6, 2018, 9 pages.
Chebotar et al., "Closing the Sim-to-Real Loop: Adapting Simulation Randomization with Real World Experience", International Conference on Robotics and Automation, May 20-24, 2019, pp. 8973-8979.
Chen et al., "Decision Transformer: Reinforcement Learning via Sequence Modeling", https://sites.google.com/berkeley.edu/decision-transformer, 35th Conference on Neural Information Processing Systems, 2021, 14 pages.
Devlin et al., "BERT: Pre-Training of Deep Bidirectional Transformers for Language Understanding", arXiv:1810.04805, 2018, 16 pages.
Erickson et al., "Assistive VR Gym: Interactions with Real People to Improve Virtual Assistive Robots", https://github.com/Healthcare-Robotics/assistive-vr-gym, IEEE, Jul. 22, 2020, pp. 299-306.
Garrett et al., "Online Replanning in Belief Space for Partially Observable Task and Motion Problems", IEEE International Conference on Robotics and Automation, May 31-Aug. 31, 2020, pp. 5678-5684.
Gopinath et al., "Human-in-the-Loop Optimization of Shared Autonomy in Assistive Robotics", IEEE Robotics and Automation Letters, vol. 2, No. 1, 2016, pp. 247-254.
Grice et al., "In-Home and Remote Use of Robotic Body Surrogates by People with Profound Motor Deficits", Department of Boimedical Engineering, arXiv:1803.01477, vol. 14, No. 3, Mar. 5, 2019, 11 pages.
Ha et al., "Recurrent World Models Facilitate Policy Evolution", 32nd Conference on Neural Information Processing Systems, arXiv:1809.01999, Sep. 4, 2018, 15 pages.
Havoutis et al., "Learning from Demonstration for Semi-Autonomous Teleoperation", https://doi.org/10.1007/s10514-018-9745-2, Autonomous Robots, vol. 43, 2019, pp. 713-726.
Janner et al., "Offline Reinforcement Learning as One Big Sequence Modeling Problem", 35th Conference on Neural Information Processing Systems, arXiv:2106.02039, Nov. 29, 2021, 17 pages.
Jeon et al., "Shared Autonomy with Learned Latent Actions", arxiv:2005.03210, May 11, 2020, 10 pages.
Levine et al., "Learning Neural Network Policies with Guided Policy Search under Unknown Dynamics", Department of Electrical Engineering and Computer Science, vol. 27, 2014, 11 pages.
Lillicrap et al., "Continuous Control with Deep Reinforcement Learning", ICLR, arXiv:1509.02971, 2015, 14 pages.
Liu et al., "Understanding Multi-Modal Perception Using Behavioral Cloning for Peg-In-a-Hole Insertion Tasks", arxiv:2007.11646, Jul. 22, 2020, 8 pages.
Mandlekar et al., "Roboturk: A CrowdSourcing Platform for Robotic Skill Learning Through Imitaion", 2nd Conference on Robot Learning, PMLR, arXiv:1811.02790, Nov. 7, 2018, pp. 879-893.
Martín-Martín et al., "Variable Impedance Control in End-Effector Space: An Action Space for Reinforcement Learning in Contact-Rich Tasks", IEEE, arXiv:1906.08880, Aug. 2, 2019, pp. 1010-1017.
Arpino et al., "Experimental Assessment of Human-Robot Teaming for Multi-Step Remote Manipulation with Expert Operators", arXiv:2011,10898, Nov. 22, 2020, 15 pages.
Arpino et al., "C-LEARN: Learning Geometric Constraints from Demonstrations for Multi-Step Manipulation in Shared Autonomy", IEEE, 2017, pp. 4058-4065.
Press et al., "Train Short, Test Long: Attention with Linear Biases Enables Input Length Extrapolation", arXiv:2108.12409, Aug. 27, 2021, 23 pages.
Ratliff et al., "Riemannian Motion Policies", arXiv:1801.02854, 2018, 15 pages.
Reddy et al., "Shared Autonomy Via Deep Reinforcement Learning", Dept. of Electrical Engineering, arXiv:1802.01744, May 23, 2018, 10 pages.
Csordás et al., "The Devil is in the Detail: Simple Tricks Improve Systematic Generalization of Transformers", arXiv:2108.12284, 2021, 16 pages.
Ross et al., "A Reduction of Imitation Learning and Structured Petition to No-Regret Online Learning", Appearing in the Proceedings of 14th International Conference on Artificial Intelligence and Statistics, JMLR, vol. 15, arXiv:1011.0686, Mar. 16, 2011, 9 pages.
Schulman et al., "Proximal Policy Optimization Algorithms", arXiv:1707.06347, Aug. 28, 2017, 12 pages.
Todorov et al., "MuJoCo: A Physics Engine for Model-Based Control", 2012 IEEE/RSJ International Conference on Intelligent Robots and Systems, Oct. 7-12, 2012, pp. 5026-5033.
Vaswani et al., "Attention is All You Need", 31st Conference on Neural Information Processing Systems, 2017, pp. 5998-6008.
Zeng et al., "Transporter Networks: Rearranging the Visual World for Robotic Manipulation", 4th Conference on Robot Learning, arXiv:2010.14406, 2020, 23 pages.
Non Final Office Action received for U.S. Appl. No. 17/695,753 dated Jun. 3, 2024, 29 pages.
Final Office Action received for U.S. Appl. No. 17/695,753 dated Oct. 10, 2024, 25 pages.

* cited by examiner

NEURAL NETWORKS TO GENERATE ROBOTIC TASK DEMONSTRATIONS

CROSS-REFERENCE TO RELATED APPLICATIONS

This application claims benefit of United States Provisional Patent Application titled "TECHNIQUES FOR IMPLEMENTING TRANSFORMERS TO COLLECT ROBOTIC TASK DEMONSTRATIONS," filed Dec. 17, 2021 and having Ser. No. 63/291,205. The subject matter of this related application is hereby incorporated herein by reference.

BACKGROUND

Field of the Various Embodiments

Embodiments of the present disclosure relate generally to machine learning and robotics and, more specifically, to implementing neural networks to generate robotic task demonstrations.

Description of the Related Art

Physical tasks can be automatically performed by robots in different real-world settings, such as industrial, household, or caregiving settings. Oftentimes, machine learning techniques are used to train robots to perform physical tasks in these types of real-world settings. For example, a robot can be trained using machine learning techniques to automatically perform assembly tasks, tasks involving the picking-and-placing of objects, packaging tasks, object stacking tasks, and/or other similar physical tasks. Many machine learning implementations involve training neural networks to enable robots to perform particular tasks without human input and/or human interaction.

Training a neural network for a given task usually requires a large training dataset that includes a sufficient number of demonstrations of robots performing the given task. Typically, robot task demonstrations are manually generated by users in a simulated environment via a simulated robot. To generate each robot demonstration, a user must manually control the simulated robot and successfully complete the given task. Accordingly, conventional techniques for generating a sufficiently large number of robot task demonstrations for use in training a neural network can be tedious, inefficient, and/or difficult to scale.

In addition, techniques for training a neural network using robot task demonstrations are typically based on configuration parameters for the particular simulator and particular robot that were used for generating the robot task demonstrations as the training data for the neural network. Consequently, conventional techniques for training a neural network typically permit only a single type of simulator and a single type of robot to be used in generating the robot task demonstrations used for training the neural network. This restriction on the type of simulator and type of robot for generating the robot task demonstrations substantially limits or prevents the ability to collect robot task demonstrations from a plurality of users that can implement different types of simulators and different types of robots, which further increases the effort and inefficiency of generating and collecting a large number of robot task demonstrations for training neural networks.

As the foregoing illustrates, what is needed in the art are more effective techniques for training neural networks and collecting robot task demonstrations for training neural networks.

SUMMARY

One embodiment of the present invention sets forth a technique for training a neural network to enable a robot task. The technique includes generating a plurality of input vectors based on a first plurality of task demonstrations associated with a first robot performing a first task in a simulated environment, wherein each input vector included in the plurality of input vectors specifies a sequence of poses of an end-effector of the first robot. The technique also includes training the neural network to generate a plurality of output vectors based on the plurality of input vectors.

One technical advantage of the disclosed techniques relative to the prior art is that, with the disclosed techniques, a neural network that enables a simulated robot to perform a given task can be trained based on the pose of a robot end-effector exhibited in robot task demonstrations of the given task. Thus, in contrast to conventional approaches, with the disclosed techniques, the neural network is not trained based on the configuration parameters associated with a simulator and/or the simulated robot that performs the given task in the robot task demonstrations. As a result, the robot task demonstrations used for training the neural network can be generated using any type of simulator and/or any type of simulated robot. Accordingly, the disclosed techniques allow robot task demonstrations for training a neural network to be generated and collected more easily and efficiently than what can be achieved using conventional techniques. These technical advantages provide one or more technological improvements over prior art approaches.

One embodiment of the present invention sets forth a technique for generating a robot task demonstration. The technique includes generating, via a simulator engine, a simulated environment that includes a robot and at least one object. The technique also includes causing the robot to at least partially perform a task associated with the at least one object within the simulated environment based on a first output vector generated by a trained neural network. The technique further includes recording demonstration data of the robot at least partially performing the task within the simulated environment.

One technical advantage of the disclosed techniques relative to the prior art is that, with the disclosed techniques, a simulator implements a trained neural network that enables a simulated robot to automatically perform a task in order to generate robot demonstrations of the task. Another technical advantage is that, with the disclosed techniques, the simulator displays a trajectory forecast that graphically illustrates the poses of the robot end-effector during a sequence of future time-steps. Based on the trajectory forecast, the user can interrupt the automatic operation of the simulated robot, provide user inputs for manually operating the simulated robot, and then allow the automatic operation of the simulated robot to resume. In this manner, the disclosed techniques provide automated operation and/or auto-assistive operation of the simulated robot when performing the task that entails only a small amount of, if any, manual operation by the user. Accordingly, the disclosed techniques allow robot task demonstrations for training a neural network to be generated and collected more easily and efficiently than can be achieved using conventional techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
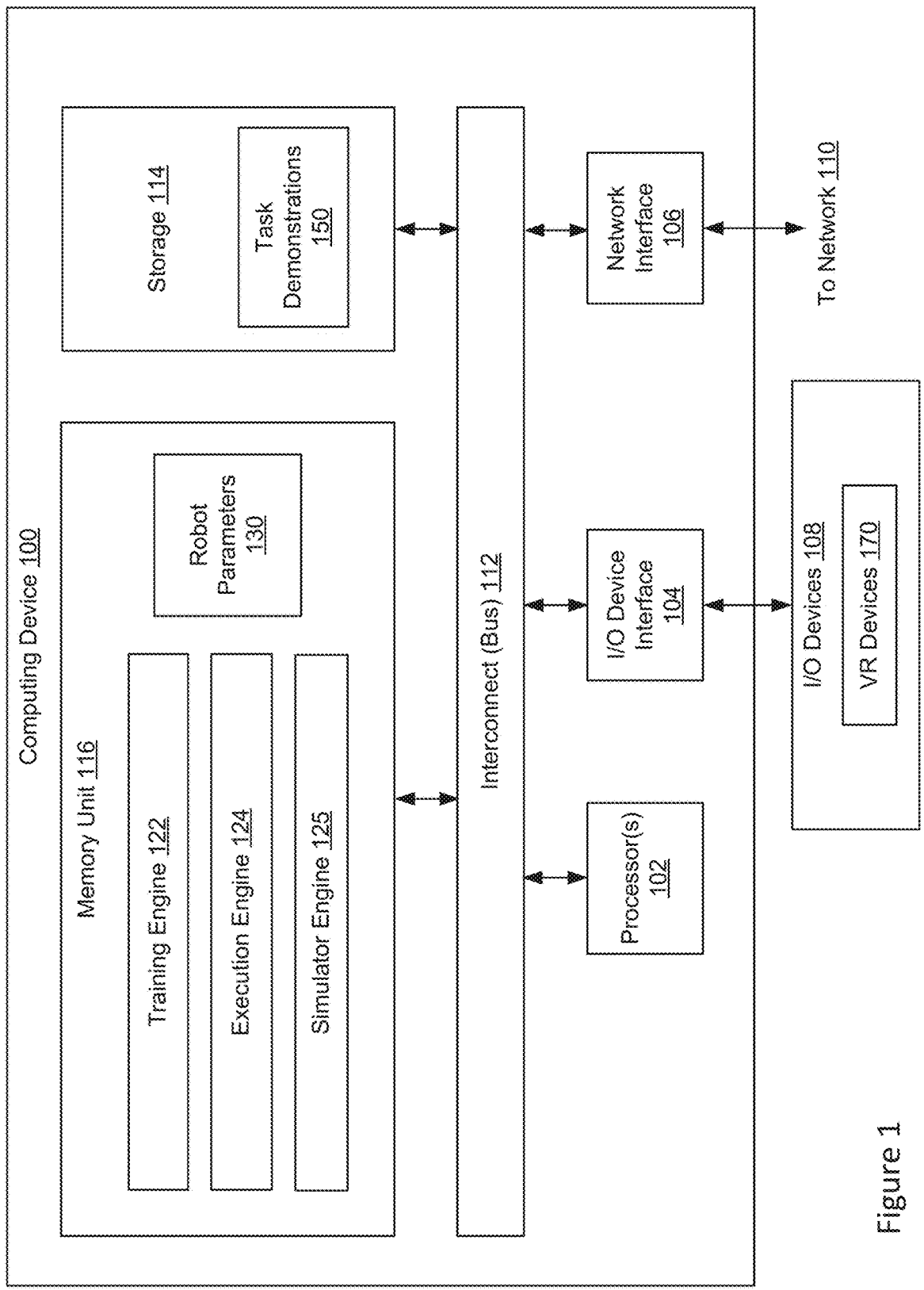
FIG. 1 illustrates a computing device configured to implement one or more aspects of various embodiments.

In the following description, numerous specific details are set forth to provide a more thorough understanding of the various embodiments. However, it will be apparent to one of skill in the art that the inventive concepts may be practiced without one or more of these specific details.

As used herein, a "transformer" indicates a type of neural network comprising a transformer-based neural network. As used herein, a "base transformer" indicates a transformer that is trained for performing a set of one or more tasks using a large training dataset (a large number of robot task demonstrations). The large training dataset can be generated using a first type of simulator and a first type of simulated robot. As used herein, a "specialized transformer" indicates a base transformer that is re-trained for performing a specific task using a smaller training dataset (a smaller number of robot task demonstrations) relative to the large training dataset used to train the base transformer. The smaller training dataset can be generated using a second type of simulator and a second type of simulated robot.

As used herein, a "transformer input vector" is received by a transformer as input. The transformer input vector comprises transformer input information for a sequence of past time steps. When training the transformer during a training phase, the transformer input information includes a state vector and an action vector for each past time step. When executing a trained transformer during a runtime phase, the transformer input information includes a state vector, an action vector, and a positional vector for each past time step. As used herein, "manual-mode transformer input information" comprises transformer input information for a sequence of past time steps that is collected during a manual mode operation of the robot.

As used herein, a "transformer output vector" is generated by a transformer as output. The transformer output vector comprises transformer output information for a sequence of future time steps. When training the transformer during a training phase and when executing a trained transformer during a runtime phase, the transformer output information includes a state vector and an action vector for each future time step.

As used herein, "executing a time step" indicates that the simulator is operating the simulated robot based on transformer output information for the time step (when in automatic mode) or based on user control inputs for the time step (when in manual mode). As used herein, an "executed time step" indicates that a time step has already occurred in the task demonstration relative to the current time.

As used herein, a "state vector" specifies states of a pose of the robot end-effector, a status of the end-effector grip, and a pose of at least one object in the simulated environment of a robot task demonstration during a particular time step. The state of an end-effector pose, end-effector grip status, or object pose for a particular time step (t) comprises the end-effector pose, end-effector grip status, or object pose, respectively, during any time point in the particular time step (t). In some embodiments, the state of an end-effector pose, end-effector grip status, or object pose for a particular time step (t) comprises the end-effector pose, end-effector grip status, or object pose, respectively, at the beginning of the particular time step (t).

As used herein, an "action vector" specifies actions of a target pose of the robot end-effector and a target status of the end-effector grip in the simulated environment of a robot task demonstration during a particular time step. The action of a target end-effector pose or target end-effector grip status for a particular time step (t) comprises the end-effector pose or end-effector grip status, respectively, that is to be achieved by the next time step (t+1). In some embodiments, the action of a target end-effector pose or target end-effector grip status for a particular time step (t) comprises the end-effector pose or end-effector grip status, respectively, at the end of the particular time step (t).

As used herein, a "positional vector" for a particular time step specifies a distance and rotation that the robot end-effector traversed during the particular time step in the simulated environment of a robot task demonstration.

As used herein, a "pose" of an end-effector or object specifies a position and orientation of the end-effector or object, respectively. The position can be specified in three-dimensional (3D) coordinates and the orientation can be specified by a four-dimensional (4D) quaternion. Therefore, pose can be specified by a seven-dimensional (7D) vector. In some embodiments, the pose of the end-effector comprises a global pose that is defined with respect to a fixed reference point/frame in the simulated environment (such as a base of the simulated robot). In some embodiments, the pose of an object comprises a local pose that is defined relative/with respect to the pose of the robot end-effector.

As used herein, a "simulator" comprises a software application that provides a 3D simulated environment in which a simulated robot performs a task on at least one object included in the 3D simulated environment. For example, the 3D simulated environment can comprise a virtual reality (VR) environment. The simulator can simulate a particular type of robot based on a set of configuration parameters associated with the particular type of robot to generate and operate the simulated robot within the simulated environment. Different types of robots have different sets of configuration parameters.

As used herein, when the simulator operates in "automatic mode," the simulator automatically operates the simulated robot based on the transformer output vectors of the transformer.

As used herein, when the simulator operates in "manual mode," the simulator operates the simulated robot based on user control inputs.

As used herein, the simulator has operated in "auto-assistive mode" when a combination of the automatic mode and manual mode were used to operate the simulated robot to successfully complete a task.

General Overview

A training technique is implemented for training a transformer for operating a simulated robot (in conjunction with a simulator) to perform a task involving interaction with at least one object in a simulated environment using robot task demonstrations. The simulated robot includes an end-effector for interacting with the at least one object when performing the task. The training technique includes training the transformer based on the poses of the robot end-effector and the poses of the at least one object exhibited in the robot task demonstrations. Each robot task demonstration comprises an overall sequence of time steps comprising all time steps for performing a task. During training using a robot task demonstration, a transformer input vector is received by the transformer comprising transformer input information for a sequence of past time steps contained in the overall sequence of time steps of the robot task demonstration. For each past time step, the transformer input information includes a state vector and an action vector. A state vector specifies a pose of the robot end-effector, a status of the end-effector grip, and a pose of at least one object associated with the past time step. An action vector specifies a target pose of the robot end-effector and a target status of the end-effector grip associated with the past time step.

Using the robot task demonstrations, the transformer is trained to generate a transformer output vector comprising transformer output information for a sequence of predicted/future time steps based on the transformer input vector. The sequence of predicted/future time steps occur just after the sequence of past time steps in the overall sequence of time steps of a robot task demonstration. For each future time step, the transformer output information includes a state vector and an action vector.

In some embodiments, the training technique does not train the transformer based on any configuration parameters of the simulator and/or the simulated robot that were used to generate and collect the robot task demonstration. Consequently, the training technique does not factor/consider configuration parameters of the simulator and/or the simulated robot when training the transformer and is agnostic to the type of simulator and/or the type of simulated robot used to generate the robot task demonstrations. As a result, robot task demonstrations (training dataset) used for training the transformer can be generated using any type of simulator and/or any type of simulated robot. Accordingly, the training technique allows robot task demonstrations for training the transformer to be generated and collected more easily and efficiently than conventional techniques.

Initially, the training technique is implemented for training a base transformer for performing a generic set of one or more of tasks using a large training dataset (a large number of robot task demonstrations). In some embodiments, a base transformer is not trained for performing a specific task. Next, the training technique is implemented for re-training the base transformer to generate a specialized transformer for performing a specific task using a smaller training dataset relative to the large training dataset used to train the base transformer. The specific task associated with the specialized transformer can comprise a task that is not included in the generic set of tasks associated with the base transformer. The smaller training dataset includes a smaller number of robot task demonstrations relative to the large number of robot task demonstrations in the large training data set used to train the base transformer. Each robot task demonstration in the smaller training dataset comprises a demonstration of a robot performing the specific task. The base transformer can be re-trained in this manner to generate any number of specialized transformers, each specialized transformer being trained for performing a different specific task.

The robot task demonstrations in the large training dataset and the smaller training dataset can be generated using any type of simulator and/or any type of simulated robot. In some embodiments, the robot task demonstrations in the large training dataset are generated using a first type of simulator and a first type of simulated robot, and the robot task demonstrations in the small training dataset are generated using a second type of simulator and a second type of simulated robot. The first type of simulator can be different from the second type of simulator. The first type of simulated robot can be different from the second type of simulated robot.

In addition to being agnostic to the type of simulator and robot during the training phase, the training technique also allows the specialized transformer to be agnostic to the type of simulator and robot used during the execution/runtime phase. In particular, any type of simulator and/or robot can be used when executing a trained specialized transformer to generate additional robot task demonstrations in a simulated environment. In some embodiments, the additional robot task demonstrations are generated using a third type of simulator and a third type of simulated robot. The third type of simulator can be different from the first type of simulator and/or the second type of simulator. The third type of simulated robot can be different from the first type of simulated robot and/or the second type of simulated robot.

An execution technique is implemented when executing a specialized transformer trained for a specific task to collect new/additional robot task demonstrations for the specific task in a simulated environment. A simulator implements the trained specialized transformer for automatically operating a simulated robot to perform the specific task to generate a robot demonstration of the specific task. When generating a robot task demonstration comprising an overall sequence of time steps, the specialized transformer receives a transformer input vector comprising transformer input information for a sequence of past time steps that are already executed/completed in the robot task demonstration. For each past time step, the transformer input information includes a state vector, an action vector, and a positional vector. A state vector specifies a pose of the robot end-effector, a status of the end-effector grip, and a pose of at least one object associated with the past time step. An action vector specifies a target pose of the robot end-effector and a target status of the end-effector grip associated with the past time step. A positional vector specifies a distance and rotation that the robot end-effector traversed during a past time step.

Based on the transformer input vector, the specialized transformer generates a transformer output vector comprising transformer output information for a sequence of predicted/future time steps that are not yet executed/completed in the robot task demonstration. The sequence of predicted/future time steps occur just after the sequence of past time steps in the overall sequence of time steps of the robot task demonstration. For each future time step, the transformer output information includes a state vector and an action vector. The simulator receives the transformer output vector from the specialized transformer and executes the sequence of future time steps by operating the simulated robot based on the transformer output information for the sequence of future time steps. In particular, for each future time step, the simulator operates the simulated robot in a suitable manner to achieve the pose of the robot end-effector and the status of the end-effector grip specified in the transformer output information for the future time step. Once executed, a future time step is included in a next sequence of past time steps that is received by the specialized transformer as input in the next execution pass/iteration of the specialized transformer.

In some embodiments, the simulator implements multiple execution passes/iterations of the specialized transformer to automatically operate the simulated robot to complete the performing of the specific task. In this manner, the trained specialized transformer is implemented to generate and collect a large number of robot task demonstrations in an automated fashion, without requiring user inputs/intervention or manual operation of the simulated robot. Accordingly, the execution technique allows robot task demonstrations to be generated and collected more easily and efficiently than conventional techniques that require extensive manual operation of the simulated robot.

When operating in automatic mode, the simulator operates the simulated robot based on the transformer output vectors of the specialized transformer. However, the simulator can also operate in manual mode when operating the simulated robot based on user control inputs instead of the transformer output vectors of the specialized transformer. In these embodiments, when the simulator receives the transformer output vector from the specialized transformer, the simulator also displays a trajectory forecast comprising a graphical representation of the sequence of future time-steps specified in the transformer output vector. In particular, the trajectory forecast graphically illustrates the poses of the robot end-effector during the sequence of future time-steps. As such, the trajectory forecast graphically illustrates the future poses of the robot end-effector that will occur in future time-steps if the simulator continues to operate in automatic mode and the user does not intervene.

Based on the trajectory forecast, the user can decide to set the simulator to manual mode to momentarily intervene and interrupt/stop the automatic mode operation of the simulated robot. During manual mode, the user provides user control inputs for manually operating the simulated robot, for example, to nudge the simulated robot in a direction that the user believes is more appropriate for successfully performing the task than indicated by the trajectory forecast. While in manual mode, the simulator executes a sequence of time steps in the robot demonstration based on the user control inputs. While in manual mode, the simulator also collects transformer input information (referred to "manual-mode transformer input information") for the sequence of time steps, including a state vector, an action vector, and a positional vector for each time step in the sequence.

After the user believes the simulated robot is back on the correct track for successfully performing the task, the user can set the simulator back to automatic mode to continue automatic operation of the simulated robot based on the outputs of the specialized transformer instead of the user control inputs, for example, to complete the task. Upon returning to automatic mode, the simulator inputs a next transformer input vector to the specialized transformer that includes at least a portion of the manual-mode transformer input information. Based on the next transformer input vector, the specialized transformer generates a next transformer output vector as the simulator returns to automatically operating the simulated robot based on the transformer output vectors of the specialized transformer. The simulator is referred to as operating in "auto-assistive mode" when a combination of automatic and manual modes are used to operate the simulated robot to successfully complete the specific task.

A successful robot task demonstration comprises a robot task demonstration wherein the simulated robot has successfully performed the specific task within a predetermined time period. When the specific task is completed entirely in the automatic mode of the simulator, the specialized transformer can be implemented to generate a robot task demonstration with a high rate of success. When the specific task is completed in the auto-assistive mode of the simulator, the specialized transformer can be implemented to generate a robot task demonstration with an even higher rate of success than when performed entirely in automatic mode. In this manner, the execution technique provides automated operation and/or auto-assistive operation of the simulated robot in successfully performing the task that requires no amount or a small amount of manual operation by the user relative to conventional techniques. Accordingly, the disclosed techniques allow robot task demonstrations for training a neural network to be generated and collected more easily and efficiently with less manual input than conventional techniques.

System Overview

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments.

Computing device 100 is configured to execute a training engine 122, execution engine 124, and simulator engine 125 that reside in a memory 116. It is noted that the computing device described herein is illustrative and that any other technically feasible configurations fall within the scope of the present disclosure. For example, multiple instances of training engine 122, execution engine 124, and simulator engine 125 could execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 can be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 can be any technically feasible hardware unit capable of processing data and/or executing software applications. Further, in the context of this disclosure, the computing elements shown in computing device 100 can correspond to a physical computing system (e.g., a system in a data center) or can be a virtual computing instance executing within a computing cloud.

I/O devices 108 include devices capable of receiving input, such as a keyboard, a mouse, a touchpad, and/or a microphone, as well as devices capable of providing output, such as a display device and/or speaker. Additionally, I/O devices 108 can include devices capable of both receiving input and providing output, such as a touchscreen, a universal serial bus (USB) port, and so forth. I/O devices 108 can be configured to receive various types of input from an end-user of computing device 100, and to also provide various types of output to the end-user of computing device 100, such as displayed digital images or digital videos or text. I/O devices 108 can also include virtual reality (VR) devices 170, such as a VR headset, VR controller, and tracking devices.

In some embodiments, one or more of I/O devices 108 are configured to couple computing device 100 to a network 110. In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and can include fixed or removable disk drives, flash memory devices, and CD-ROM, DVD-ROM, Blu-Ray, HD-DVD, or other magnetic, optical, or solid-state storage devices. Training engine 122, execution engine 124, and simulator engine 125 can be stored in storage 114 and loaded into memory 116 when executed. In addition, storage 114 can store additional robot task demonstrations 150 that are generated and collected during a runtime phase of the specialized transformer.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122, execution engine 124, and simulator engine 125.

Training engine 122 includes functionality to train a machine learning model on a training dataset (robot task demonstrations), and execution engine 124 includes functionality to execute one or more portions of the machine learning model to generate additional data (additional robot task demonstrations 150) that is not found in the training dataset. For example, training engine 122 can train a number of neural networks included in the machine learning model on a set of robot task demonstrations, and execution engine 124 could execute a portion of the trained neural networks to produce additional robot task demonstrations 150 that are not found in the set of robot task demonstrations. In turn, the additional robot task demonstrations 150 can be used to re-train the machine learning model and/or other neural networks. In some embodiments, the machine learning model comprises a transformer-based neural network (transformer). In other embodiments, the machine learning model comprises other types of neural networks that are implemented to generate robot task demonstrations.

The simulator 125 operates in conjunction with the execution engine 124 to generate and collect the additional robot task demonstrations 150 by providing a 3D simulated environment (such as a VR environment) that includes a simulated robot and at least one simulated object on which the simulated robot performs a particular task. Tasks can include industrial tasks (such as block stacking, nut assembly, kit assembly, and the like), household tasks (such as bowl manipulation, opening drawers, closing doors, and the like), personal caregiving tasks (such as drink assistance, massaging, scratching, and the like), and any other types of tasks. The simulated object can represent any type of object, such as a box, bowl, furniture, a person, animal, and the like. In some embodiments, the simulated environment comprises a VR environment that the user can interact via VR devices 170, such as a VR headset for displaying the VR environment and a VR controller for manually operating the simulated robot.

The simulator 125 can comprise any type of simulator, such as the NVIDIA Omniverse™, MuJoCo, pyBullet, Gazebo, and the like. In other embodiments, the simulator 125 can comprise any other type of simulator. Each different type of simulator is defined by different configuration parameters that specify, for example, a control method, data collection rate, simulation method, simulation time-step (dt), and a solver or optimizer used to move forward the simulation. Such parameters can also include parameters related to the object/scene which are defined in a Universal Scene Description (USD) model, such as physics properties including friction, mass, inertia, and the like.

The simulator 125 receives a set of robot configuration parameters 130 that define the configuration of a simulated robot that includes an end-effector. The end-effector comprises the portion of the robot that interacts with an object in the simulated environment for performing a task associated with the object. The end-effector is also referred to as a robot gripper or robot hand. The set of robot configuration parameters 130 defines a model of the simulated robot. The set of robot configuration parameters 130 specifies the physical properties of the robot, such as the geometric shape, inertia, and masses of the robot. For example, the set of robot configuration parameters 130 can specify the physical properties of the joints, links between the joints, and end-effector of the robot (such as the shape and number of fingers in the end-effector). Each different type of simulated robot is defined by a different set of robot configuration parameters 130. For example, a first type of robot is defined by a first set of robot configuration parameters and a second type of robot is defined by a second set of robot configuration parameters that is different than the first set of robot configuration parameters. Examples of different types of robot include Baxter, Sawyer, Franka, and the like.

As the simulated robot performs (in automatic mode and/or manual mode) the particular task in the simulated environment, the simulator 125 records demonstration data describing the performance of the particular task in the simulated environment that is then included in a new robot task demonstration 150 for the particular task. In some embodiments, the simulator 125 records demonstration data describing an entire sequence of end-effector poses, end-effector grip statuses, and object poses for at least one object during the complete performance of the particular task, which is included in the new robot task demonstration 150 for the particular task. In other embodiments, the simulator 125 records other data describing the performance of the particular task in the simulated environment that is included in the new robot task demonstration 150. Each new robot task demonstration 150 can then be stored to a database or datastore, such as the storage 114.

Training the Transformer

Figure 2:
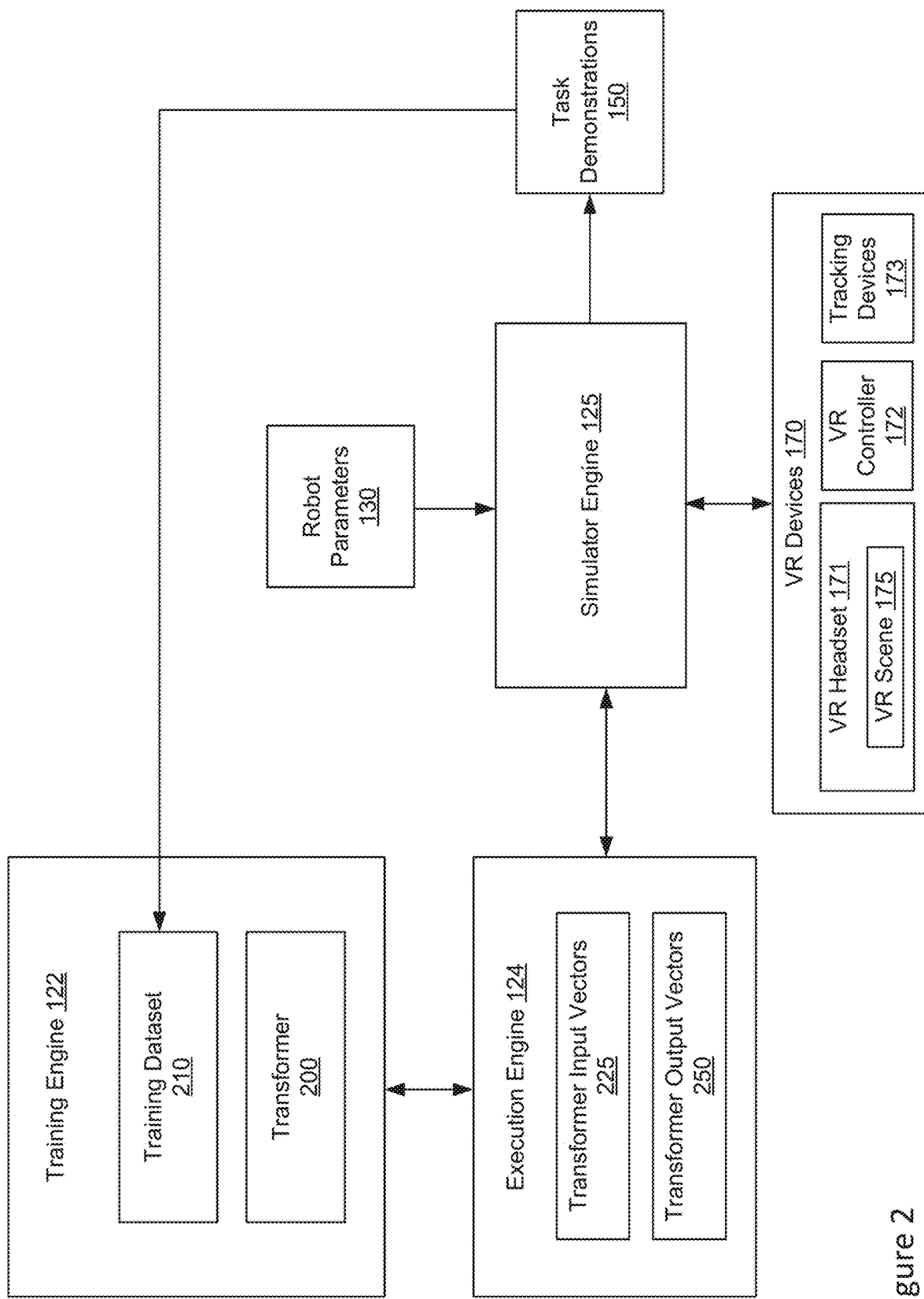
FIG. 2 is a more detailed illustration of the training engine, execution engine, and simulator engine of FIG. 1, according to various embodiments.

FIG. 2 is a more detailed illustration of the training engine, execution engine, and simulator engine of FIG. 1, according to various embodiments. As shown, the execution engine 124 is coupled to the training engine 122 and the simulator engine 125. The simulator engine 125 is also coupled to VR devices 170.

The training engine 122 includes a training dataset 210 and a transformer 200. The training dataset 210 includes a plurality of robot task demonstrations. In general, training engine 122 trains the transformer 200 to generate transformer output information for sequences of future time steps based on transformer input information for sequences of past time steps of the robot task demonstrations (training dataset 210). In some embodiments, the transformer 200 comprises a base transformer that is trained for controlling a simulated robot to perform a set of generic tasks using the training dataset 210. In particular, the base transformer is trained to assist a simulator to operate a simulated robot to perform a set of generic tasks. In other embodiments, the transformer 200 comprise a specialized transformer that is trained for controlling a simulated robot to perform a specific task using the training dataset 210. In particular, the specialized transformer is trained to assist a simulator to operate a simulated robot to perform a specific task.

When the transformer 200 comprises the base transformer, the training dataset 210 comprises a large training dataset comprising a large number of robot task demonstrations of a set of generic tasks. When the transformer 200 comprises a specialized transformer, the training dataset 210 comprises a smaller training dataset (relative to the large training dataset) comprising a smaller number of robot task demonstrations for a specific task (relative to the large number of robot task demonstrations). A specialized transformer is generated by re-training (fine tuning) the base transformer using the smaller training dataset to perform a specific task. In this manner, different specialized transformers can be generated by re-training the base transformer to perform different specific tasks using different smaller training datasets.

The training technique described herein can be applied to training the base transformer and/or the specialized transformer and is agnostic to the type of simulator and the type of robot used to collect the robot task demonstrations. For example, the large training dataset can comprise robot task demonstrations collected using a first type of simulator and a first type of robot. For example, the large training dataset can comprise the Roboturk dataset comprising robot task demonstrations collected using the Mujoco simulator and the Baxter robot. The smaller training dataset can comprise robot task demonstrations collected using a second type of simulator that is different from the first type of simulator and a second type of robot that is different from the first type of robot. For example, the smaller training dataset can comprise robot task demonstrations collected using the NVIDIA Omniverse™ simulator and the Franka robot.

During training, the training engine 122 trains the transformer 200 using the training dataset 210 comprising a plurality of robot task demonstrations. A robot task demonstration comprises an overall sequence of time steps Td. For each robot task demonstration, the training engine 122 samples a sub-sequence of length Ts (such as Ts=400) from the robot task demonstration Td, where Td equals the number of time steps in the robot task demonstration, Ts equals the number of time steps in the sampled sub-sequence, and Td>Ts.

The training engine 122 then derives transformer input information for the sub-sequence Ts of the robot task demonstration, including a vector pair (T) comprising a state vector (s) and an action vector (a) for each time step of the sub-sequence Ts. The training engine 122 retains the transformer input information for the first Tp time steps of sub-sequence Ts and masks with zeros the transformer input information for the remaining time steps (Ts−Tp) of sub-sequence Ts. Therefore, the training engine 122 retains the transformer input information for a first initial set of time steps of sub-sequence Ts and masks the transformer input information for a second remaining set of time steps of sub-sequence Ts with zeros. The first initial set of time steps corresponds to past time steps and the second remaining set of time steps corresponds to future time steps. The value for Tp can be chosen at random during training to force the transformer 200 to make future predictions of an arbitrary length. The transformer input information for the second remaining set of time steps of sub-sequence Ts is stored for later use in executing the loss function.

The transformer input vector received by the transformer 200 as input comprises the transformer input information for the first initial set of time steps of sub-sequence Ts. Therefore, the transformer input vector comprises a sequence/trajectory of state-action pairs for the first initial set of time steps of sub-sequence Ts, as represented by the equation (1):

$$T_x = \{s_x, a_x\} \quad (1)$$

The transformer 200 is then trained to generate/predict a transformer output vector comprising transformer output information for the second remaining set of time steps (Ts−Tp) of sub-sequence Ts that are masked. In particular, the transformer 200 is trained to predict a vector pair (T) comprising a state vector (s) and an action vector (a) for each time step of the second remaining set of time steps (Ts−Tp). Therefore, the transformer output vector comprises a sequence/trajectory of state-action pairs for the second remaining set of time steps of sub-sequence Ts, as represented by equation (2):

$$\hat{\tau}_y = \{\hat{s}_y, \hat{a}_y\}. \quad (2)$$

At each particular time step, the state vector specifies states for a pose of the robot end-effector, a status of the end-effector grip, and a pose of at least one object in the simulated environment of the robot task demonstration during the particular time step. In some embodiments, the pose of the end-effector comprises a global pose that is defined with respect to a fixed reference point/frame in the simulated environment (such as a base of the simulated robot). In some embodiments, the pose of an object comprises a local pose that is defined relative/with respect to the pose of the robot end-effector. The state of an end-effector pose, end-effector grip status, or object pose for a particular time step (t) comprises the end-effector pose, end-effector grip status, or object pose during any time point in the particular time step (t). In some embodiments, the state of an end-effector pose, end-effector grip status, or object pose for a particular time step (t) comprises the end-effector pose, end-effector grip status, or object pose at the beginning of the particular time step (t).

The state of the end-effector pose ($s_r$) is defined by a position ($p_r$) and orientation ($q_r$) of the end-effector for the particular time step (t). The position can be specified in three-dimensional (3D) coordinates and the orientation can be specified by a four-dimensional (4D) quaternion. Therefore, the state of the end-effector pose can be specified by a seven-dimensional (7D) vector, as represented by equation (3):

$$s_{r,t}=[p_{r,t},q_{r,t}] \quad (3)$$

The state of the end-effector grip status ($s_g$) is specified as either open (0) or closed (1) for a particular time step (t), as represented by equation (4):

$$s_{g,t} \in [0,1] \quad (4)$$

For a particular object (oi), the state of the object pose ($s_{oi}$) is defined by a position ($p_{oi}$) and orientation ($q_{oi}$) of the particular object for a particular time step (t). The state of the object pose can be specified by a seven-dimensional (7D) vector, as represented by equation (5):

$$s_{oi,t}=[p_{oi,t},q_{oi,t}] \quad (5)$$

At each particular time step, the action vector specifies actions for a target pose of the robot end-effector and a target status of the end-effector grip in the simulated environment of the robot task demonstration during the particular time step. The action of a target end-effector pose or target end-effector grip status for a particular time step t comprises the end-effector pose or end-effector grip status that is to be achieved by the next time step (t+1). In some embodiments, the action of a target end-effector pose or target end-effector grip status for a particular time step t comprises the end-effector pose or end-effector grip status at the end of the particular time step t.

The action of the target end-effector pose ($a_r$) is defined by a target position ($p_{rtarget}$) and target orientation ($q_{rtarget}$) of the end-effector for a particular time step (t). The action of the target end-effector pose can be specified by a seven-dimensional (7D) vector, as represented by equation (6):

$$a_{r,t}=[p_{rtarget,t},q_{rtarget,t}] \quad (6)$$

The action of the target end-effector grip status ($a_g$) is specified as either open (0) or closed (1) for a particular time step (t), as represented by equation (7):

$$a_{g,t} \in [0,1] \quad (7)$$

A sequence of state vectors for the first set of time steps of sub-sequence Ts specifies the pose of the robot end-effector, the status of the end-effector grip, and a pose of J objects for each time step, where k represents the last time step in the first set of time steps, is represented by equation (8):

$$s_x=\{s_{r,t},s_{o1,t} \ldots s_{oJ,t},s_{g,t}\}_{t=0}^k \quad (8)$$

A sequence of action vectors for the first set of time steps of sub-sequence Ts specifies the target pose of the robot end-effector and the target status of the end-effector grip for each time step, where k represents the last time step in the first set of time steps, is represented by equation (9):

$$a_x=\{a_{r,t} \ldots a_{g,t}\}_{t=0}^k \quad (9)$$

The sequence of state vectors and the sequence of action vectors for the first initial set of time steps of sub-sequence Ts comprise the transformer input vector that the transformer 200 receives as input. Based on the transformer input vector, the transformer 200 is trained to generate/predict a transformer output vector comprising transformer output information for the second remaining set of time steps (future steps) of sub-sequence Ts. In some embodiments, the transformer output vector is predicted based on the transformer input vector using a generative pretrained transformer (GPT)-style transformer comprising a language model that predicts a next word in a sequence, as shown in equation (10):

$$\hat{s}_y,\hat{a}_y=\text{GPT}(s_x,a_x) \quad (10)$$

The transformer output vector includes a predicted future sequence of state vectors for the second remaining set of time steps of sub-sequence Ts that specifies the pose of the robot end-effector, the status of the end-effector grip, and a pose of J objects for each time step, where k+1 represents the first time step and T represents the last time step in the second remaining set of time steps, is represented by equation (11):

$$s_x=\{s_{r,t},s_{o1,t} \ldots s_{oJ,t},s_{g,t}\}_{t=k+1}^T \quad (11)$$

The transformer output vector also includes a predicted future sequence of action vectors for the second set of time steps of sub-sequence Ts that specifies the target pose of the robot end-effector and the target status of the end-effector grip for each time step, where k+1 represents the first time step and T represents the last time step in the second remaining set of time steps, is represented by equation (12):

$$a_y=\{a_{r,t},a_{g,t}\}_{t=k+1}^T \quad (12)$$

To train the transformer 200, the training engine 122 implements a loss function that compares the predicted output from the transformer 200 and the expected/correct output. In particular, the loss function compares the transformer output vector (prediction) that specifies transformer input information for the second remaining set of time steps of sub-sequence Ts to the actual/correct transformer input information for the second remaining set of time steps of sub-sequence Ts before the transformer input information was masked with zeros. Before masking with zeros, the actual/correct transformer input information for the second remaining set of time steps of sub-sequence Ts is stored for use by the loss function.

The loss function generates a scalar loss value that indicates the progression of the training of the transformer 200. For example, if the predicted output from the transformer 200 and the expected/correct output are very close, the loss value is close to zero, which indicates the transformer 200 has learned how to accurately map a transformer input vector to a transformer output vector. If the loss value is not zero or below a predetermined threshold value, the training engine 122 adjusts parameters of the transformer 200 until the loss value becomes zero or falls below the predetermined threshold value. For example, the training engine 122 can adjust the parameters of the transformer 200 using a gradient descent of the loss function and backpropagation to update weights in encoder and decoder neural networks of the transformer 200 in a way that reduces the loss.

The loss function computes the loss associated with the state of the end-effector pose (position and orientation). To do so, for each time step of the predicted output, the state of the end-effector pose is mapped to 8 corners of a 3D bounding box around the end-effector, as shown in equation (13):

$$\hat{c}_{s_r} = \text{CORNERS}(\hat{p}_{s_r}, \hat{q}_{s_r}) \qquad (13)$$

For each corresponding time step of the expected output, the state of the end-effector pose is also mapped to 8 corners of a bounding box for the end-effector, where $c_{s_r} \in R^{8 \times 3}$, as shown in equation (14):

$$c_{s_r} = \text{CORNERS}(p_s, q_s) \qquad (14)$$

The loss associated with the state of the end-effector pose is then computed as a sum of the L2 distances (Euclidean distances) of the corresponding 8 corners of the predicted output and the expected output, as shown in equation (15):

$$\mathcal{L}_{s_r} = \sum_{t=T_p}^{T_s} \|\hat{c}_{s_r,t} - c_{s_r,t}\|_2 \qquad (15)$$

Therefore, the loss ($\text{Ls}_r$) associated with the state of the end-effector pose comprises a single dimension scalar value that takes into account the L2 distance for all 8 corresponding corners of the predicted output and the expected output.

The loss function also computes the loss ($\text{La}_r$) associated with the action of the target end-effector pose in a similar manner as computed for the loss ($\text{Ls}_r$) associated with the state of the end-effector pose. In particular, for each time step of the predicted output, the action of the target end-effector pose is mapped to 8 corners of a bounding box for the end-effector. For each corresponding time step of the expected output, the action of the target end-effector pose is also mapped to 8 corners of a bounding box for the end-effector. The loss ($\text{La}_r$) associated with the action of the target end-effector pose is then computed as a sum of the L2 distances (Euclidean distances) of the corresponding 8 corners of the predicted output and the expected output. Therefore, the loss ($\text{La}_r$) associated with the action of the target end-effector pose comprises a single dimension scalar value that takes into account the L2 distance for all 8 corresponding corners of the predicted output and the expected output.

The loss function also computes the loss ($\text{Ls}_{oi}$) associated with the state of the pose of object i in a similar manner as computed for the loss ($\text{Ls}_r$) associated with the state of the end-effector pose. In particular, for each time step of the predicted output, the state of the object pose is mapped to 8 corners of a bounding box for the object. For each corresponding time step of the expected output, the state of the object pose is also mapped to 8 corners of a bounding box for the object. The loss associated with the state of the object pose is then computed as a sum of the L2 distances (Euclidean distances) of the corresponding 8 corners of the predicted output and the expected output. Therefore, the loss ($\text{Ls}_{oi}$) associated with the state of the pose of object i comprises a single dimension scalar value that takes into account the L2 distance for all 8 corresponding corners of the predicted output and the expected output. The total losses for the state of J total objects is then summed, as shown in equation (16):

$$\sum_{i=1}^{J} \mathcal{L}_{s_{oi}} \qquad (16)$$

The loss function also computes the loss ($\text{Ls}_g$) associated with the state of the end-effector grip status. To do so, the loss function computes the loss on the grip status state using binary cross entropy, as shown in equation (17):

$$\mathcal{L}_{s_g} = \sum_{t=T_p}^{T_s} BCE(\hat{s}_{g,t}, s_{g,t}) \qquad (17)$$

The loss function also computes the loss ($\text{La}_g$) associated with the action of the target end-effector grip status. To do so, the loss function computes the loss on the grip action state using binary cross entropy, as shown in equation (18):

$$\mathcal{L}_{s_g} = \sum_{t=T_p}^{T_s} BCE(\hat{a}_{g,t}, a_{g,t}) \qquad (18)$$

The loss function then sums all the above computed losses to determine a total loss ($L_{TOTAL}$) between the predicted output from the transformer 200 and the expected/correct output, as shown in equation (19):

$$\mathcal{L}_{TOTAL} = \mathcal{L}_{s_r} + \mathcal{L}_{a_r} + \sum_{i=1}^{J} \mathcal{L}_{s_{oi}} + \lambda(\mathcal{L}_{s_g} + \mathcal{L}_{a_g}) \qquad (19)$$

As described above, the training engine 122 trains the transformer 200 based on the pose of the robot end-effector, end-effector grip status, and the pose of at least one object exhibited in robot task demonstrations (training dataset 210) for performing a task. In some embodiments, the transformer 200 is not trained based on any configuration parameters of the simulator and/or the simulated robot that are used for generating the robot task demonstrations. Therefore, the characteristics and configuration of the simulator and/or the simulated robot are abstracted and made irrelevant to the training of the transformer 200. As a result, the robot task demonstrations (training dataset 210) can be generated using any type of simulator and/or any type of simulated robot. In addition, any type of simulator and/or robot can be used during execution of the transformer 200 to generate additional robot task demonstrations.

Figure 3:
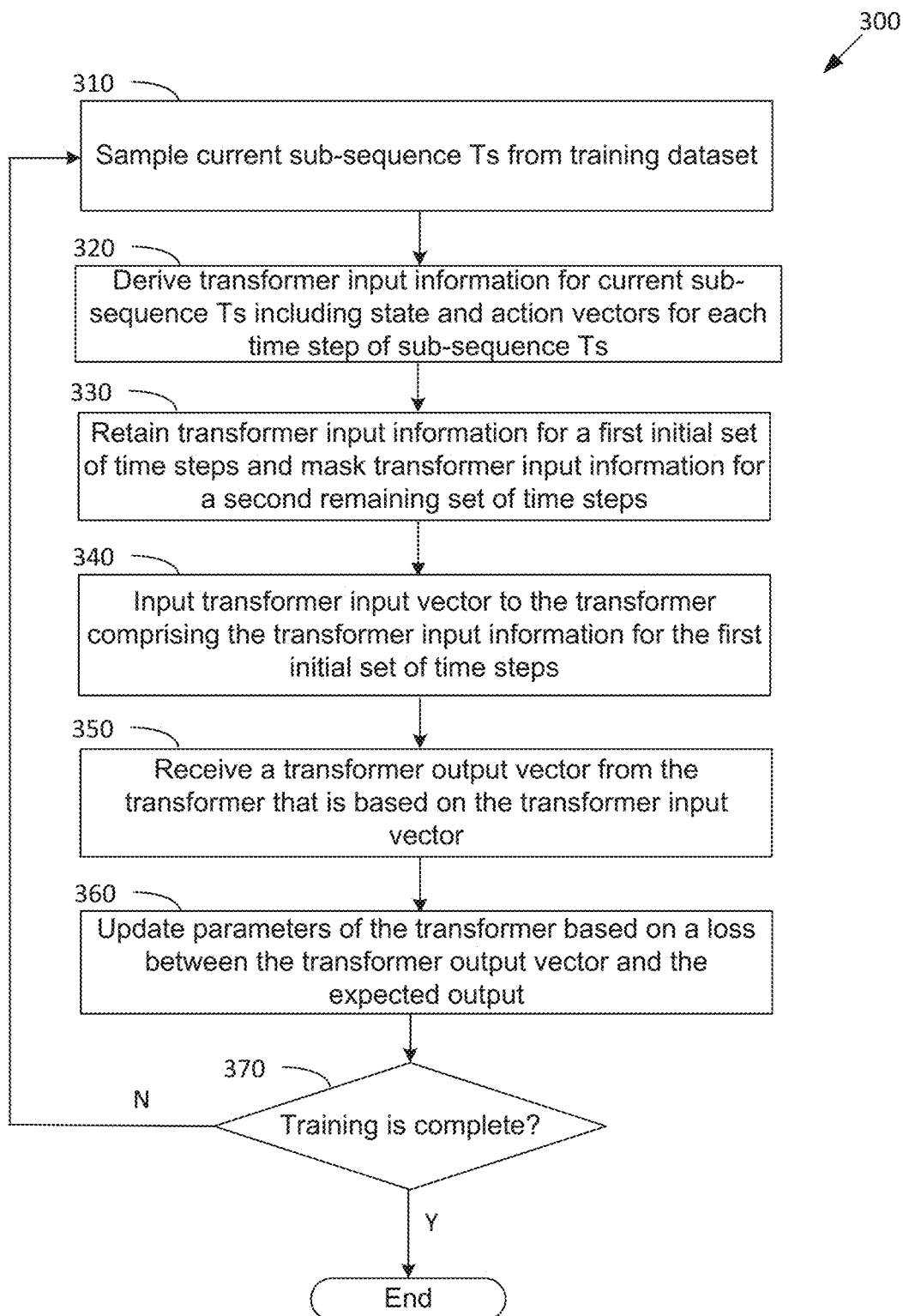
FIG. 3 is a flow diagram of method steps for training a transformer, according to various embodiments.

FIG. 3 is a flow diagram of method steps for training a transformer, according to various embodiments. Although the method steps are described in conjunction with the systems of FIGS. 1-2, persons skilled in the art will understand that any system configured to perform the method steps in any order falls within the scope of the present disclosure. The method 300 is executed by a training engine 122 that trains a transformer 200 for controlling a simulated robot to perform a set of one or more tasks using a training dataset 210. In particular, the transformer 200 is trained to assist a simulator to operate a simulated robot to perform a set of one or more tasks. In some embodiments, the transformer 200 comprises a base transformer and the training dataset 210 comprises a large dataset. In other embodiments, the transformer 200 comprises a specialized transformer and the training dataset 210 comprises a smaller dataset (relative to the large dataset). The training dataset 210 comprises a plurality of robot task demonstrations of simulated robots performing one or more tasks, such as industrial tasks, household tasks, and/or personal caregiving tasks. The plurality of robot task demonstrations can be generated from one or more different types of simulators 125 and one or more different types of robots.

As shown, at step 310, the training engine 122 samples a current sub-sequence of length Ts from a robot task demonstration within the training dataset 210. A robot task demonstration comprises an overall sequence of time steps Td, and the training engine 122 can sample a sub-sequence of length Ts (such as Ts=400) from the robot task demonstration Td, where Ts equals the number of time steps in the sampled sub-sequence Ts.

At step 320, the training engine 122 derives transformer input information for the current sub-sequence Ts. The transformer input information for the current sub-sequence Ts includes a vector pair (T) comprising a state vector (s) and an action vector (a) for each time step of the sub-sequence Ts. At each particular time step, the state vector specifies states for a pose of the robot end-effector, a status of the end-effector grip, and a pose of at least one object in the simulated environment during the particular time step. The state of the end-effector pose ($s_r$) is defined by a 3D position ($p_r$) and 4D orientation ($q_r$) of the end-effector for the particular time step (t), as shown in equation (3). The state of the end-effector grip status ($s_g$) is specified as either open (0) or closed (1) for the particular time step (t), as shown in equation (4). For an object (oi), the state of the object pose ($s_{oi}$) is defined by a 3D position ($p_{oi}$) and 4D orientation ($q_{oi}$) of the object for the particular time step (t), as shown in equation (5). At each particular time step, the action vector specifies actions for a target pose of the robot end-effector and a target status of the end-effector grip in the simulated environment during the particular time step. The action of the target end-effector pose ($a_r$) is defined by a 3D target position ($p_{rtarget}$) and 4D target orientation ($q_{rtarget}$) of the end-effector for the particular time step (t), as shown in equation (6). The action of the target end-effector grip status ($a_g$) is specified as either open (0) or closed (1) for a particular time step (t), as shown in equation (7).

At step 330, the training engine 122 retains the transformer input information for a first initial set of Tp time steps of current sub-sequence Ts, and masks with zeros the transformer input information for a second remaining set of time steps (Ts−Tp) of current sub-sequence Ts. The first initial set of time steps corresponds to past time steps and the second remaining set of time steps corresponds to future time steps. The transformer input information for the second remaining set of time steps of current sub-sequence Ts is stored for later use in executing the loss function.

At step 340, the training engine 122 inputs a transformer input vector to the transformer 200 comprising the transformer input information for the first initial set of time steps of current sub-sequence Ts. The transformer input vector comprises a sequence of state-action pairs for the first initial set of time steps, as shown in equation (1). The sequence of state vectors for the first set of time steps of current sub-sequence Ts specifies the pose of the robot end-effector, the status of the end-effector grip, and a pose of J objects for each time step, as shown in equation (8). The sequence of action vectors for the first set of time steps of current sub-sequence Ts specifies the target pose of the robot end-effector and the target status of the end-effector grip for each time step, as shown in equation (9).

At step 350, the training engine 122 receives a transformer output vector from the transformer 200 that is based on the transformer input vector. In general, the transformer 200 is trained to generate/predict a transformer output vector comprising transformer output information for the second remaining set of time steps of current sub-sequence Ts based on the transformer input information for the first initial set of time steps of current sub-sequence Ts. In particular, the transformer 200 is trained to predict a vector pair (T) comprising a state vector (s) and an action vector (a) for each time step of the second remaining set of time steps, as shown in equation (2). In some embodiments, the transformer output vector is predicted based on the transformer input vector using a generative pretrained transformer (GPT)-style transformer, as shown in equation (10). The transformer output vector includes a predicted future sequence of state vectors for the second remaining set of time steps that specifies the pose of the robot end-effector, the status of the end-effector grip, and a pose of J objects for each time step, as shown in equation (11). The transformer output vector also includes a predicted future sequence of action vectors for the second set of time steps that specifies the target pose of the robot end-effector and the target status of the end-effector grip for each time step, as shown in equation (12).

At step 360, the training engine 122 updates parameters of the transformer 200 based on a loss between the predicted output from the transformer 200 and the expected/correct output. In particular, the training engine 122 implements a loss function to compare the transformer output vector (predicted output) that specifies transformer input information for the second remaining set of time steps of current sub-sequence Ts to the actual transformer input information (expected output) for the second remaining set of time steps of current sub-sequence Ts (before the transformer input information was masked with zeros). For example, the loss function can compute a loss value comprising an L2 loss and/or another measure of error between the predicted output from the transformer 200 and the expected/correct output, as shown in equations (13)-(19). The training engine 122 can adjust the parameters of the transformer 200 using a gradient descent of the loss function and backpropagation to update weights in encoder and decoder neural networks of the transformer 200 in a way that reduces the loss value.

At step 370, the training engine 122 determines whether or not training of the transformer 200 is complete. For example, training engine 122 could determine that training is complete when one or more conditions are met. These condition(s) include (but are not limited to) convergence in the parameters of the encoder and decoder neural networks of the transformer 200, or the lowering of the loss value to below a predetermined threshold value. If training of the transformer 200 is not complete, the method 300 continues at step 310, whereby the training engine 122 samples a next sub-sequence of length Ts from a current or next robot task demonstration within the training dataset 210. In this manner, the method 300 can train the transformer 200 by generating a plurality of input vectors based on a plurality of task demonstrations of a robot performing a task in a simulated environment, wherein each input vector specifies at least a sequence of poses of an end-effector of the robot, and the neural network is trained to generate a plurality of output vectors based on the plurality of input vectors until training is complete. If training of the transformer 200 is determined to be complete, the method 300 then ends.

As described above, the training engine 122 trains the transformer 200 based on the pose of the robot end-effector, end-effector grip status, and the pose of at least one object exhibited in task demonstrations (training dataset 210) for performing a set of one or more tasks. In some embodiments, the transformer 200 is not trained based on any configuration parameters of the simulator and/or the simulated robot that are used for generating the task demonstrations. As a result, the robot task demonstrations (training dataset 210) can be generated using any type of simulator and/or any type of simulated robot.

Figure 4:
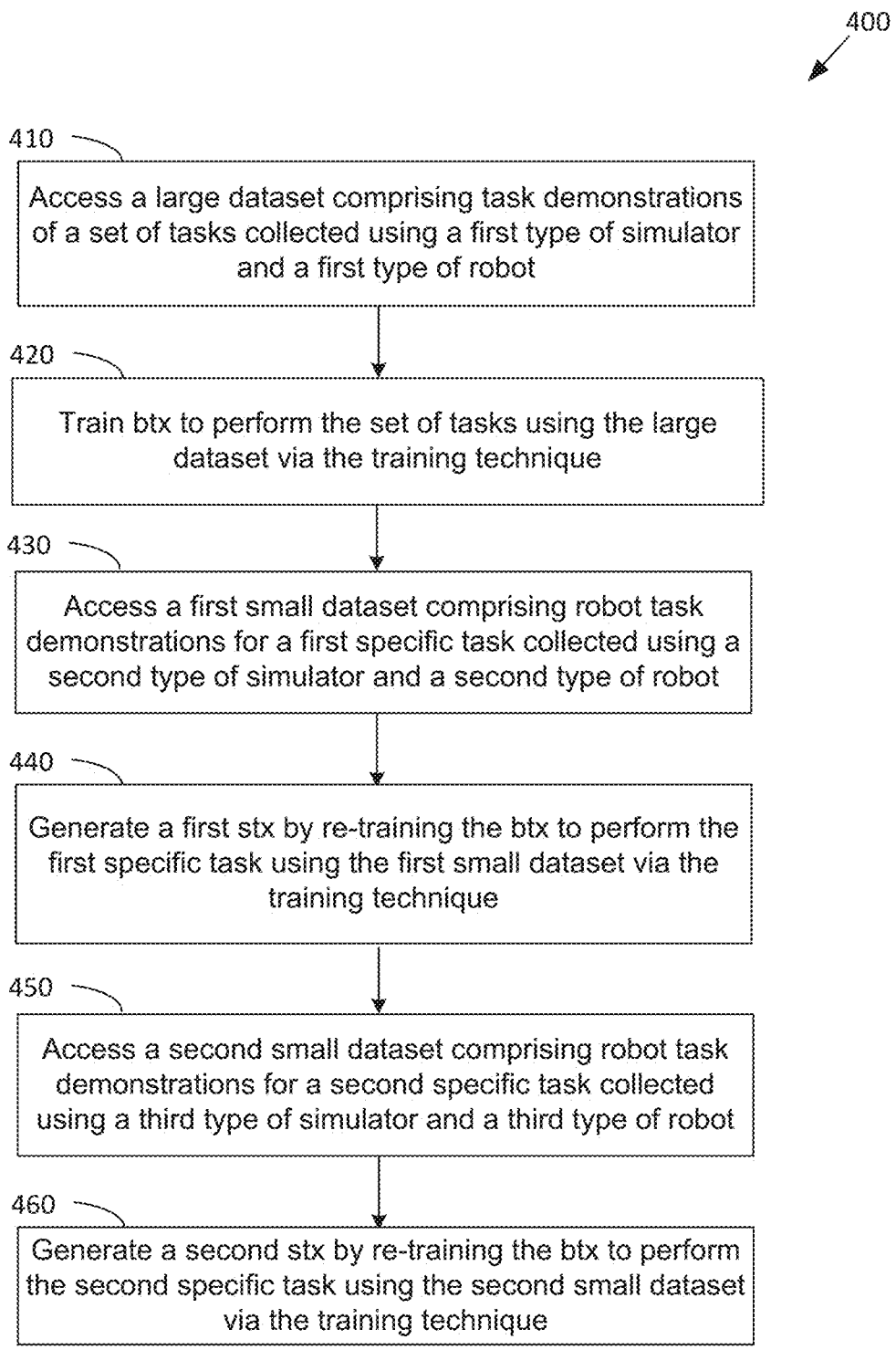
FIG. 4 is a flow diagram of method steps for training multiple specialized transformers, according to various embodiments.

FIG. 4 is a flow diagram of method steps for training multiple specialized transformers, according to various embodiments. Although the method steps are described in conjunction with the systems of FIGS. 1-2, persons skilled in the art will understand that any system configured to perform the method steps in any order falls within the scope of the present disclosure.

As shown, at step 410, the training engine 122 accesses a training dataset 210 comprising a large dataset that includes a large number of robot task demonstrations, such as the Roboturk dataset. The robot task demonstrations can be collected using any type of simulator and any type of robot, such as a first type of simulator and a first type of robot. The large dataset comprises task demonstrations of a set of one or more tasks, such as industrial, household, and/or caregiving tasks. At step 420, the training engine 122 trains a base transformer to control a simulated robot to perform the set of one or more tasks using the large dataset using the training technique illustrated in FIG. 3.

At step 430, the training engine 122 accesses a training dataset 210 comprising a first small dataset that includes a smaller number of robot task demonstrations relative to the large dataset. The first small dataset includes robot task demonstrations that can be collected using any type of simulator and any type of robot, such as a second type of simulator that is different from the first type of simulator and/or a second type of robot that is different from the first type of robot. The first small dataset includes robot task demonstrations of a first specific task, such as an industrial, household, or caregiving task. At step 440, the training engine 122 generates a first specialized transformer by re-training the base transformer to control a simulated robot to perform the first specific task using the first small dataset using the training technique illustrated in FIG. 3. In some embodiments, the set of tasks associated with the base transformer comprises a set of one or more tasks and the first specific task is not included in the set of one or more tasks. In other embodiments, the set of tasks associated with the base transformer comprises a set of two or more tasks and the first specific task is included in the set of two or more tasks.

At step 450, the training engine 122 accesses a training dataset 210 comprising a second small dataset that includes a smaller number of robot task demonstrations relative to the large dataset. The second small dataset includes robot task demonstrations that can be collected using any type of simulator and any type of robot, such as a third type of simulator that is different from the first type of simulator and/or the second type of simulator and/or a third type of robot that is different from the first type of robot and/or the second type of robot. The second small dataset includes robot task demonstrations of a second specific task, such as an industrial, household, or caregiving task. At step 460, the training engine 122 generates a second specialized transformer by re-training the base transformer to control a simulated robot to perform the second specific task using the second small dataset using the training technique illustrated in FIG. 3. In some embodiments, the set of tasks associated with the base transformer comprises a set of one or more tasks and the second specific task is not included in the set of one or more tasks. In other embodiments, the set of tasks associated with the base transformer comprises a set of two or more tasks and the second specific task is included in the set of two or more tasks.

Various steps of the method 400 can be repeated to generate a plurality of specialized transformers for performing a plurality of different specific tasks. By implementing the training technique illustrated in FIG. 3, the different specialized transformers can be trained using different small datasets that are collected using different types of simulators and/or robots. In addition, once trained, any type of simulator and/or robot can be used during execution of the specialized transformer to generate additional robot task demonstrations for a specific task associated with the specialized transformer during an execution phase, as discussed below.

Executing the Transformer for Collecting New Demonstrations

Referring back to FIG. 2, after the transformer 200 is trained using the small training dataset associated with a specific task, the transformer 200 comprises a specialized transformer that is trained for controlling a simulated robot to perform the specific task. The execution engine 124 then executes the transformer 200 and operates in conjunction with the simulator 125 for generating and collecting new demonstrations of a simulated robot performing the specific task in a simulated environment. For example, the execution engine 124 can receive transformer input vectors 225 from the simulator 125 and input the transformer input vectors 225 to the transformer 200. The execution engine 124 can also receive transformer output vectors 250 from the transformer 200 and transmit the transformer output vectors 250 to the simulator 125.

The simulator 125 generates the simulated environment and configures the simulated robot according to a set of robot configuration parameters 130. The simulator 125 implements the specialized transformer for automatically operating the simulated robot to perform the specific task to generate a robot demonstration of the specific task. The type of simulator 125 and/or the type of simulated robot (as defined by the set of robot configuration parameters 130) can be the same or different from the types of simulators 125 and/or the types of simulated robots used to generate and collect the training dataset 210. After execution of the transformer 200, the new robot task demonstrations can be used by the training engine 122 to further train the transformer 200. The new robot task demonstrations can also be stored in a storage 114 to be used for training other additional neural networks.

In particular, during the creation of a new robot task demonstration, the execution engine 124 executes the transformer 200 to generate a series of transformer output vectors 250 based on a series of transformer input vectors 225. Each transformer output vector 250 is generated based on a corresponding transformer input vector 225. Each transformer input vector 225 comprises a transformer input information for a sequence of past time steps of a currently executing robot task demonstration. Each transformer output vector 250 comprises predicted transformer output information for a sequence of future time steps of the currently executing robot task demonstration.

Figure 5:
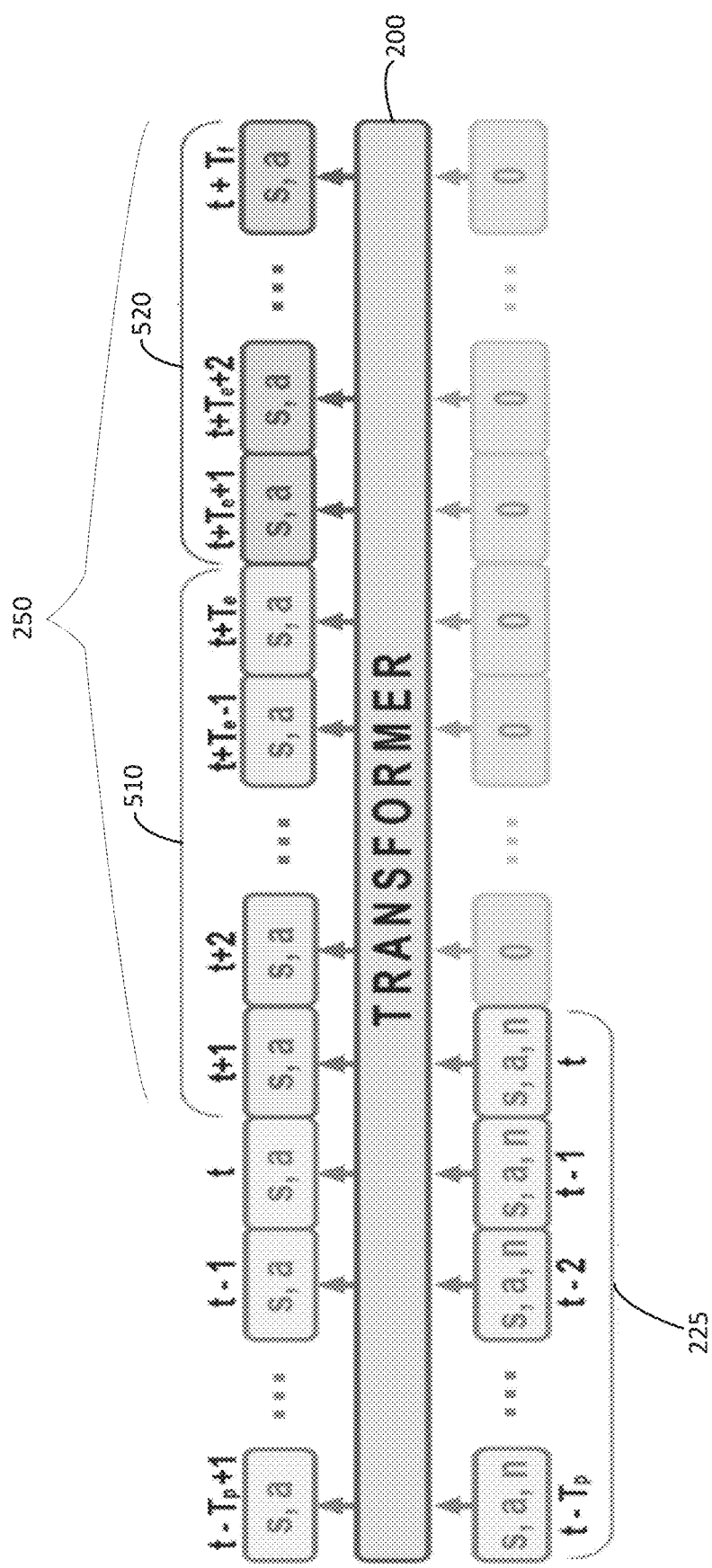
FIG. 5 illustrates input vectors and output vectors associated with the transformer of FIG. 2, according to various embodiments.

FIG. 5 illustrates input vectors and output vectors associated with the transformer of FIG. 2, according to various embodiments. A currently executing robot task demonstration in the example of FIG. 2 is currently at time step (t), wherein time step (t) is the most recently time step executed by the simulator 125.

In some embodiments, for each execution iteration of the transformer 200, the transformer 200 receives a sequence of Tp past time steps (transformer input vector 225) and generates a sequence of Tf future time steps (transformer output vector 250), wherein the input sequence length equals Tp and the output sequence length equals Tf. For each execution iteration of the transformer 200, the simulator 125 executes a sub-portion of the sequence of Tf future time steps by executing a sequence of Te future time steps within the sequence of Tf future time steps (where Te is less than Tf). Once executed, the sequence of Te future time steps is included in the sequence of Tp past time steps in the next execution iteration of the transformer 200.

As shown, the transformer 200 receives a transformer input vector 225 comprising transformer input information for a sequence of past time steps from (t−Tp) through (t) of the currently executing robot task demonstration. For each past time step, the transformer input information includes a state vector (s), an action vector (a), and a positional vector (n). As shown, the information for future time steps received as input by the transformer 200 is padded with zeros, forcing the transformer 200 to generate information for future time steps only from information from past time steps.

Based on the transformer input vector 225, the transformer 200 generates a transformer output vector 250 comprising transformer output information for a sequence of predicted future time steps from (t+1) through (t+Tf) of the currently executing robot task demonstration. For each future time step, the transformer input information includes a state vector (s) and an action vector (a). The sequence of future time steps includes two sub-portions: a first sub-portion of time steps 510 and a second sub-portion of time steps 520. The first sub-portion of time steps 510 from (t+1) through (t+Te) comprises future time steps that are currently being executed by the simulator 125 and/or have already been loaded by the simulator 125 for execution in the current execution iteration of the transformer 200. In some embodiments, the number of time steps Te in the first sub-portion of time steps 510 comprises the number of time steps executed in each pass/iteration of the transformer 200. In some embodiments, a user cannot manually interrupt the execution of the first sub-portion of time steps 510.

The second sub-portion of time steps 520 comprises future time steps that occur after the first sub-portion of time steps 510. The second sub-portion of time steps 520 from (t+Te+1) through (t+Tf) comprises future time steps that are not currently being executed by the simulator 125 and/or have not already been loaded by the simulator 125 for execution in the current execution iteration of the transformer 200. In some embodiments, a user can manually interrupt/stop the execution of the second sub-portion of time steps 520 (i.e., prevent the execution of the second sub-portion of time steps 520).

Each transformer input vector 225 (as represented by the equation (1)) is input to corresponding embedding functions within the input layer of the transformer 200. In particular, the state vector (s) of the transformer input vector 225 is received by a state embedding function, the action vector (a) of the transformer input vector 225 is received by an action embedding function, and the positional vector (n) of the transformer input vector 225 is received by a positional embedding function.

For each past time step, the state vector (s) specifies states of a pose of the end-effector, a status of the end-effector grip, and a pose of at least one object for each time step. For each time step, the state of the end-effector pose ($s_r$) can be specified by a 7D vector, as shown in equation (3). For each time step, the state of the end-effector grip status ($s_g$) is specified as either open (0) or closed (1) as shown in equation (4). For each time step for a particular object (oi), the state of the object pose ($s_{oi}$) can be specified by a 7D vector, as shown in equation (5). The state embedding function represents the state vector (s) in 128 dimensions that correspond to the latent variables/parameters that are learned by the transformer 200. For each past time step, the state vector (s) is input to the state embedding function ($F_s$) which is represented as a single fully connected network layer of the transformer 200, as shown in equation (20):

$$s_{emb,t} = \mathcal{F}_s(s_t) \tag{20}$$

For each past time step, the action vector (a) specifies actions of a target pose of the end-effector and a target status of the end-effector grip. For each time step, the action of the target end-effector pose ($a_r$) can be specified by a 7D vector, as shown in equation (6). For each time step, the action of the target end-effector grip status ($a_g$) is specified as either open (0) or closed (1) as shown in equation (7). The action embedding function represents the action vector (a) in 128 dimensions that correspond to the latent variables/parameters that are learned by the transformer 200. For each past time step, the action vector (a) is input to the action embedding function ($F_a$) which is represented as a single fully connected network layer of the transformer 200, as shown in equation (21):

$$a_{emb,t} = \mathcal{F}_a(a_t) \tag{21}$$

For each past time step, the positional vector (n) specifies a distance and rotation that the robot end-effector traversed during the time step. In general, the positional vector is computed using a cumulative distanced traversed by the end-effector in Euclidean space during the time step. The positional vector can comprise a dimensional integer value (integer token) that indicates both the traversal distance and rotation of the end-effector during the time-step. The positional vector (n) is represented in equation (22):

$$n_t = \sum_{t'=2}^{t} \sum_{j=1}^{8} \|c_{r,j,t'} - c_{r,j,t'-1}\|_2 \tag{22}$$

In equation (22), each $c_r$ comprises 3D coordinates of a 3D bounding box around the end-effector at a given time-step. The value of $c_r$ is a function of the end-effector pose at the given time-step. The pose representation (position and quaternion) is used since pose specifies rotation in a position space, which mitigates the problem of combining heterogenous terms in a same function. The positional embedding function represents the positional vector (n) in 128 dimensions that correspond to the latent variables/parameters that are learned by the transformer 200. For each past time step, the positional vector (n) is input to the positional embedding function ($F_n$) which is represented as a single fully connected network layer of the transformer 200, as shown in equation (23):

$$n_{emb,t} = \mathcal{F}_n(n_t) \tag{23}$$

The positional embedding is added to each of the state embedding and action embedding. The resulting embeddings are combined to produce an input vector (x), wherein "LN" represents layer normalization, as shown in equation (24):

$$x_t = \text{LN}((s_{emb,t} + n_{emb,t}) \oplus (a_{emb,t} + n_{emb,t})) \tag{24}$$

The input vector is received by the transformer 200, which represents the input vector in 256 dimensions that correspond to a concatenation of the 128 dimensional representations from each of the state vector and the action vector. For each input vector, the transformer 200 generates a corresponding predicted vector that is also represented in 256 dimensions to mirror the dimensions of the input vector. The predicted vector is then decoded with linear layers on an output side of the transformer 200 that mirrors the linear layers on the input side of the transformer 200. The decoded predicted vector comprises a transformer output vector 250 that is output by the transformer 200 at the output/decoding layer of the transformer 200.

Referring back to FIG. 5, in automatic mode, the simulator 125 receives the transformer output vector 250 from the transformer 200 and executes the sequence of future time steps by operating the simulated robot based on the transformer output information for the sequence of future time steps. In particular, for each future time step, the simulator 125 operates the simulated robot in a suitable manner that achieves the pose of the robot end-effector and the status of the end-effector grip specified in the transformer output information for the future time step. For example, the simulator 125 can operate the simulated robot using Riemannian motion policies (RMP) to achieve the pose of the robot end-effector and the status of the end-effector grip specified in the transformer output information for the future time step. The RMP technique comprises a method to predict the acceleration and velocities of the simulated robot based on current joint positions and joint targets of the simulated robot. In other embodiments, another motion technique is used by the simulator 125 to operate the simulated robot based on the transformer output information. Once executed, a future time step is included in a next sequence of past time steps that is received by the transformer 200 as input in the next execution pass/iteration of the transformer 200.

In some embodiments, the simulator 125 causes multiple execution passes/iterations of the transformer 200 to automatically operate the simulated robot to complete the performing of the specific task. In this manner, the transformer 200 is implemented to generate and collect any number of robot task demonstrations in an automated fashion, without requiring user inputs/intervention or manual operation of the simulated robot. Accordingly, the execution technique allows robot task demonstrations to be generated and collected more easily and efficiently than conventional techniques that require extensive manual operation of the simulated robot.

When operating in automatic mode, the simulator 125 operates the simulated robot based on the transformer output vectors of the transformer 200. However, the simulator 125 can also operate in manual mode when operating the simulated robot based on user control inputs instead of the transformer output vectors of the transformer 200. In these embodiments, when the simulator 125 receives the transformer output vectors 250 from the specialized transformer, the simulator also displays a trajectory forecast comprising a graphical representation of the sequence of future time-steps specified in the transformer output vectors 250. In particular, the trajectory forecast graphically illustrates the pose of the robot end-effector during the sequence of future time-steps. As such, the trajectory forecast graphically illustrates the future poses of the robot end-effector that will occur in future time-steps of the robot task demonstration if the simulator continues to operate in automatic mode and the user does not intervene.

For example, the simulator 125 can generate a simulated environment comprising a VR environment. In these embodiments, the simulator 125 is also coupled to VR devices 170 including a VR headset 171, a VR controller 172, and one or more tracking devices 173. The VR controller 172 comprises a VR-tracked device that is tracked by the tracking devices 173. The VR controller 172 can comprise a controller that operates in 3D. The VR headset 171 comprises a VR-tracked device that is tracked by the tracking devices 173. The tracking devices 173 can track the 3D position of the VR headset 171 and VR controller 172. Each tracking device 173 can include various components (not shown) for performing the above-described functions of the tracking device 173. In other embodiments, other types of display devices and input controllers can be used.

The VR headset 171 can display various VR scenes 175 of a 3D VR environment generated by the simulator 125. A VR scene 175 comprises a particular view of the VR environment depending on the viewpoint of the VR headset 171. The displayed VR scenes 175 include the simulated robot and at least one object on which the simulated robot performs a task. The VR scenes 175 can also include the trajectory forecasts representing the sequences of future time-steps that will occur in the robot task demonstration if the simulator 125 continues to operate in automatic mode.

However, based on the trajectory forecast, the user can decide to set the simulator 125 to manual mode (via the VR controller 172) to momentarily intervene and interrupt/stop the automatic mode operation of the simulator 125 and simulated robot (i.e., prevent the execution of at least a portion of the future time steps). During manual mode, the user provides user control inputs (via the VR controller 172) for manually operating the simulated robot, for example, to nudge the simulated robot in a direction that the user believes is more appropriate for successfully performing the task than indicated by the trajectory forecast. While in manual mode, the simulator 125 executes a sequence of time steps in the overall sequence of time steps of the robot demonstration based on the user control inputs. While in manual mode, the simulator 125 also collects transformer input information (referred to "manual-mode transformer input information") for the executed sequence of time steps, including a state vector, an action vector, and a positional vector for each time step in the executed sequence.

After the user believes the simulated robot is back on the correct track for successfully performing the task, the user can set the simulator 125 back to automatic mode (via the VR controller 172) to continue automatic operation of the simulated robot based on the outputs of the transformer 200, instead of the user control inputs. Upon returning to automatic mode, the simulator 125 inputs a next transformer input vector to the transformer 200 that includes at least a portion of the manual-mode transformer input information. Based on the next transformer input vector, the transformer 200 generates a next transformer output vector as the simulator 125 returns to automatically operating the simulated robot based on the transformer output vectors of the transformer 200.

Figure 6:
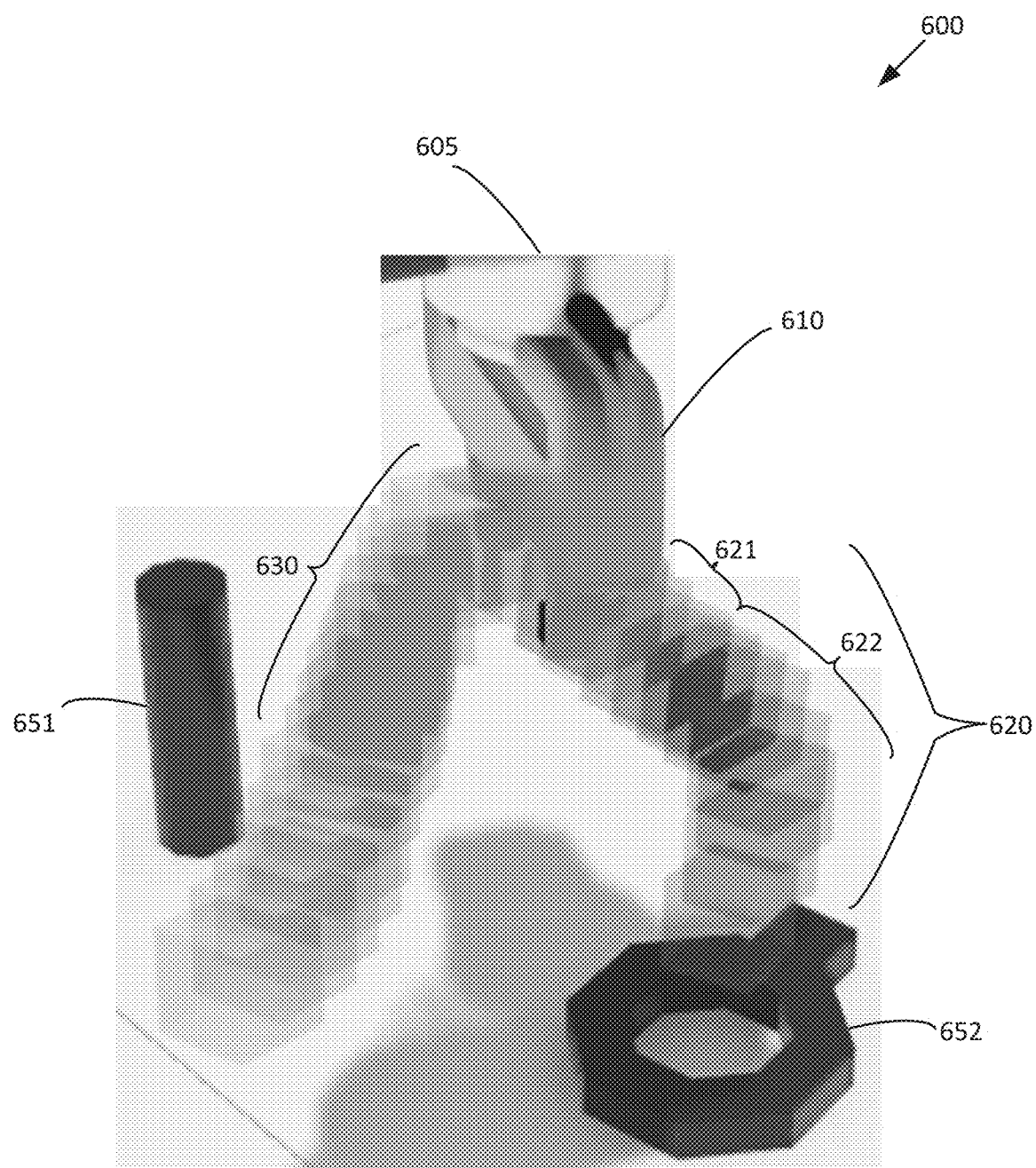
FIG. 6 illustrates a trajectory forecast associated with an industrial task performed by a first simulated robot, according to various embodiments.

FIG. 6 illustrates a trajectory forecast associated with an industrial task performed by a first simulated robot, according to various embodiments. In some embodiments, the robot task demonstrations 150 include demonstrations of industrial tasks, such as nut assembly, kit assembly, box stacking, and the like. As shown, a robot task demonstration performed in a virtual environment 600 comprises a demonstration of a first simulated robot 605 having a first robot end-effector 610 performing a nut assembly task on a first object 651 and a second object 652 in the virtual environment 600.

The simulator 125 generates a trajectory forecast 620 that graphically represents the sequences of future time-steps that will occur in the robot task demonstration if the simulator 125 continues to operate the in first simulated robot 605 in automatic mode. In particular, the trajectory forecast 620 graphically illustrates the pose of the first robot end-effector 610 during the sequence of future time-steps. As such, the trajectory forecast 620 graphically illustrates the future poses of the first robot end-effector 610 that will occur in future time-steps if the simulator 125 continues to operate in automatic mode. In some embodiments, the trajectory forecast 620 graphically represents the poses of the first robot end-effector 610 using a simple 3D geometry, such as a cube (as shown), sphere, and the like. In other embodiments, the trajectory forecast 620 graphically represents the pose of the first robot end-effector 610 using a 3D geometry that resembles the first robot end-effector 610. Based on the trajectory forecast 620, the user can decide to set the simulator 125 to manual mode to manually control the simulated robot 605 (via the VR controller 172), and then return the simulator 125 to automatic mode.

As discussed above, the sequence of future time steps includes a first sub-portion of time steps 510 and a second sub-portion of time steps 520. The first sub-portion of time steps 510 comprises future time steps that are currently being executed by the simulator 125. The second sub-portion of time steps 520 comprises future time steps that are not currently being executed by the simulator 125. In some embodiments, the trajectory forecast 620 includes a first sub-portion of the trajectory forecast 621 and a second sub-portion of the trajectory forecast 622. The first sub-portion of the trajectory forecast 621 graphically represents the first sub-portion of time steps 510 and the second sub-portion of the trajectory forecast 621 graphically represents the second sub-portion of time steps 520. The simulator 125 can display the first sub-portion of the trajectory forecast 621 with a first graphical appearance and display the second sub-portion of the trajectory forecast 622 with a second graphical appearance that is different than the first graphical appearance. For example, the simulator 125 can display the first sub-portion 621 with a different color, shading, contrast, and/or 3D geometry than the second sub-portion 622.

In further embodiments, the simulator 125 also generates a past trajectory 630 that graphically represents the sequences of past time-steps that have already been executed by the simulator 125. In particular, the past trajectory 630 graphically illustrates the pose of the first robot end-effector 610 during a sequence of past time-steps. In some embodiments, the past trajectory 630 graphically represents the pose of the first robot end-effector 610 using a simple 3D geometry, such as a cube (as shown), sphere, and the like. In other embodiments, the past trajectory 630 graphically represents the pose of the first robot end-effector 610 using a 3D geometry that resembles the first robot end-effector 610. The simulator 125 can display the past trajectory 630 with a third graphical appearance that is different than the first graphical appearance and/or the second graphical appearance. For example, the simulator 125 can display the past trajectory 630 with a different color, shading, contrast, and/or 3D geometry than the first sub-portion 621 and/or second sub-portion 622. For example, the past trajectory 630 can be graphically represented as a yellow cube, the first sub-portion 621 can be graphically represented as a green cube, and the second sub-portion 622 can be graphically represented as a blue cube.

Figure 7:
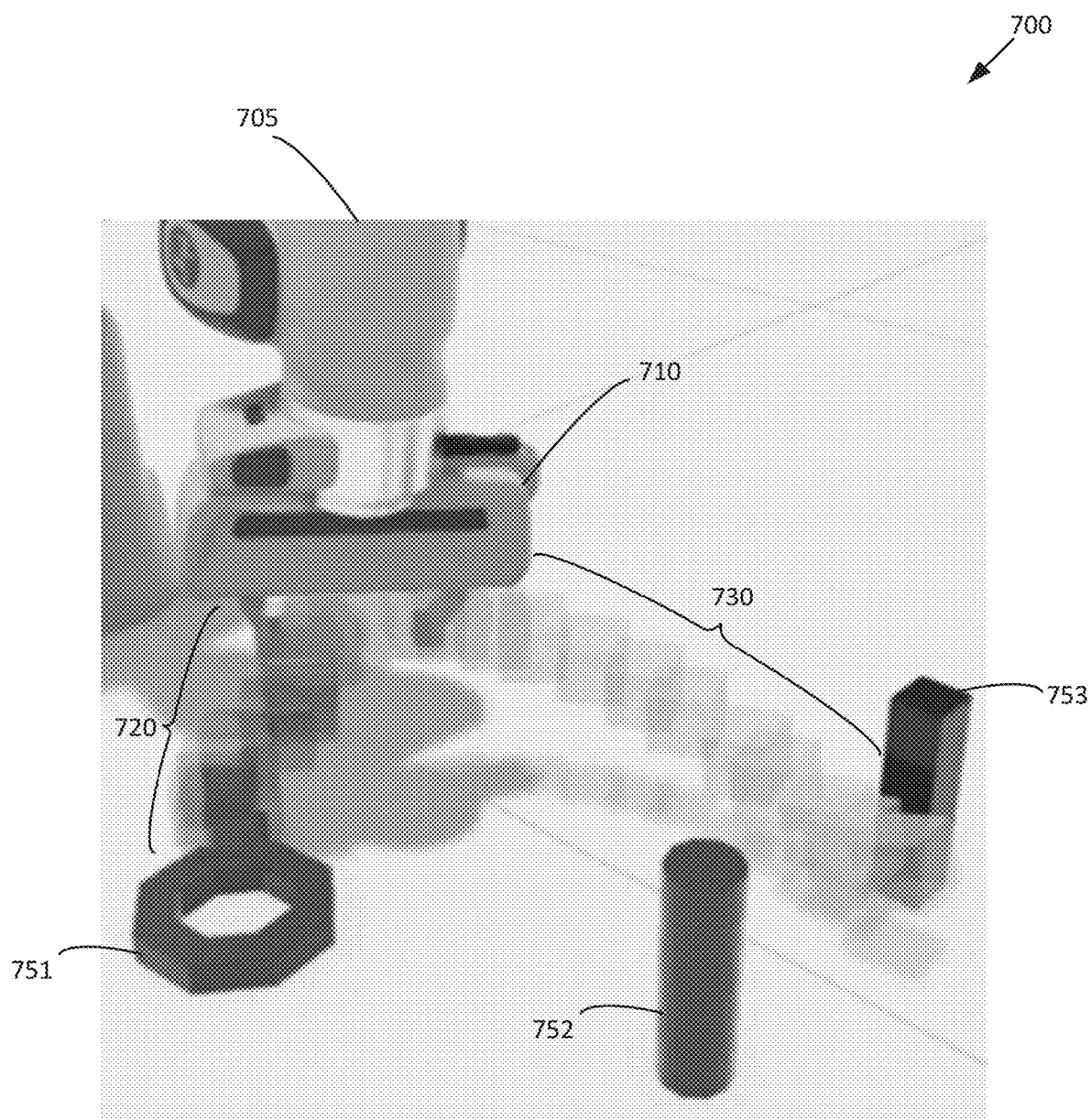
FIG. 7 illustrates a trajectory forecast associated with an industrial task performed by a second simulated robot, according to various embodiments.

FIG. 7 illustrates a trajectory forecast associated with an industrial task performed by a second simulated robot, according to various embodiments. As shown, a robot task demonstration performed in a virtual environment 700 comprises a demonstration of a second simulated robot 705 having a second robot end-effector 710 performing a nut assembly task on a first object 751, second object 752, and third object 753 in the virtual environment 700. Note that the second simulated robot 705 is a different type of robot and has a different configuration than the first simulated robot 605 illustrated in FIG. 6. Also, the second robot end-effector 710 is a different type of robot end-effector and has a different configuration than the first robot end-effector 610 illustrated in FIG. 6.

The simulator 125 generates a trajectory forecast 720 that graphically illustrates the pose of the second robot end-effector 710 during a sequence of future time-steps. The trajectory forecast 720 graphically represents the pose of the second robot end-effector 710 using a simple 3D geometry (such as a cube as shown) or a 3D geometry that resembles the second robot end-effector 710. Based on the trajectory forecast 720, the user can decide to set the simulator 125 to manual mode to manually control the simulated robot 705 (via the VR controller 172), and then return the simulator 125 to automatic mode. The simulator 125 also generates a past trajectory 730 that graphically illustrates the pose of the second robot end-effector 710 during a previous sequence of past time-steps. The simulator 125 can display the trajectory forecast 720 with a first graphical appearance and display the past trajectory 730 with a second graphical appearance that is different from the first graphical appearance.

Figure 8:
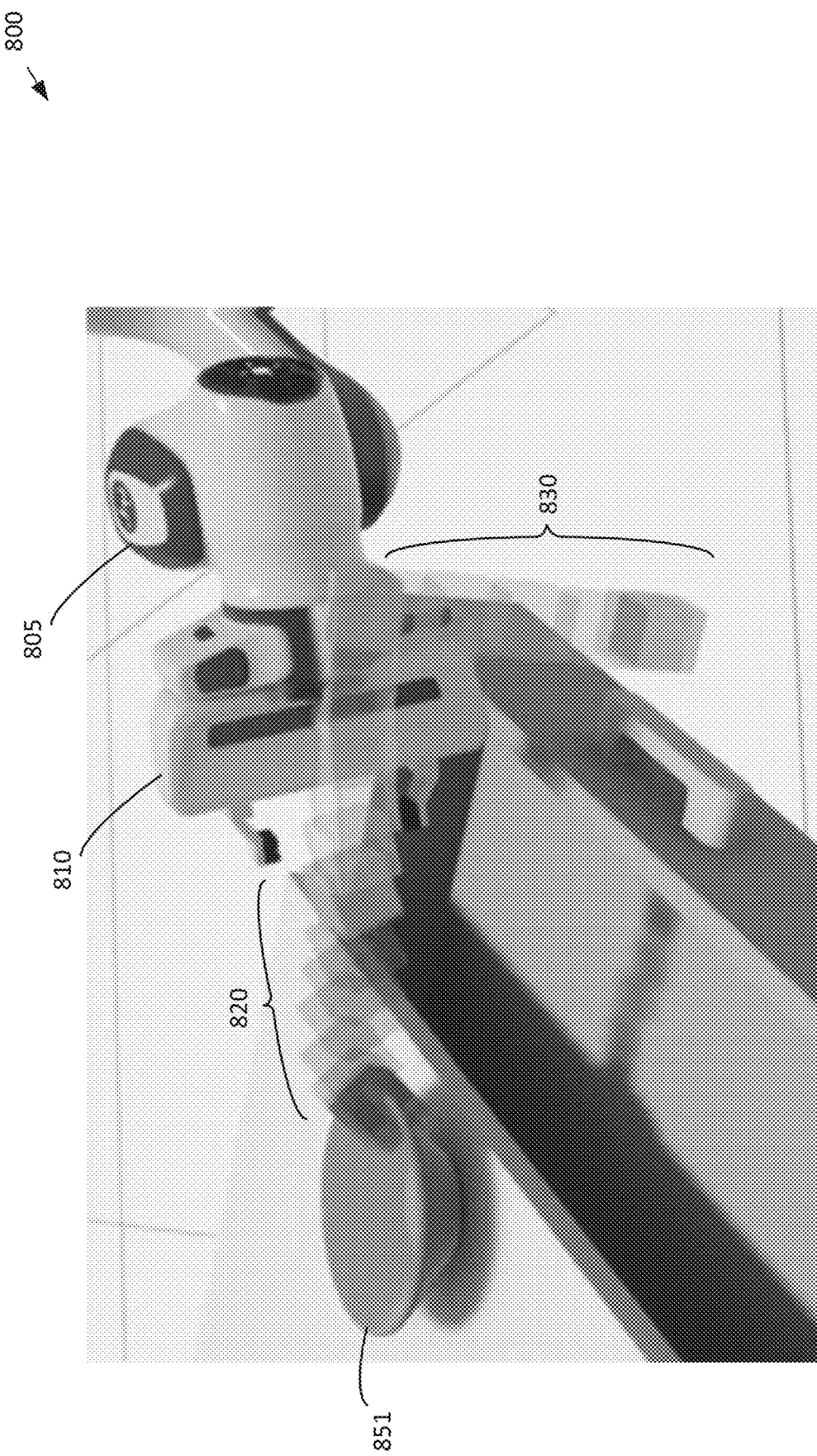
FIG. 8 illustrates a trajectory forecast associated with a household task performed by a third simulated robot, according to various embodiments.

FIG. 8 illustrates a trajectory forecast associated with a household task performed by a third simulated robot, according to various embodiments. In some embodiments, the robot task demonstrations 150 include demonstrations of household tasks, such as bowl manipulation, opening drawers, closing doors, and the like. As shown, a robot task demonstration performed in a virtual environment 800 comprises a demonstration of a third simulated robot 805 having a third robot end-effector 810 performing a bowl manipulation task on a first object 851 in the virtual environment 800. The simulator 125 generates a trajectory forecast 820 that graphically illustrates the pose of the third robot end-effector 810 during a sequence of future time-steps. Based on the trajectory forecast 820, the user can decide to set the simulator 125 to manual mode to manually control the simulated robot 805 (via the VR controller 172), and then return the simulator 125 to automatic mode. The simulator 125 also generates a past trajectory 830 that graphically illustrates the pose of the third robot end-effector 810 during a previous sequence of past time-steps.

Figure 9:
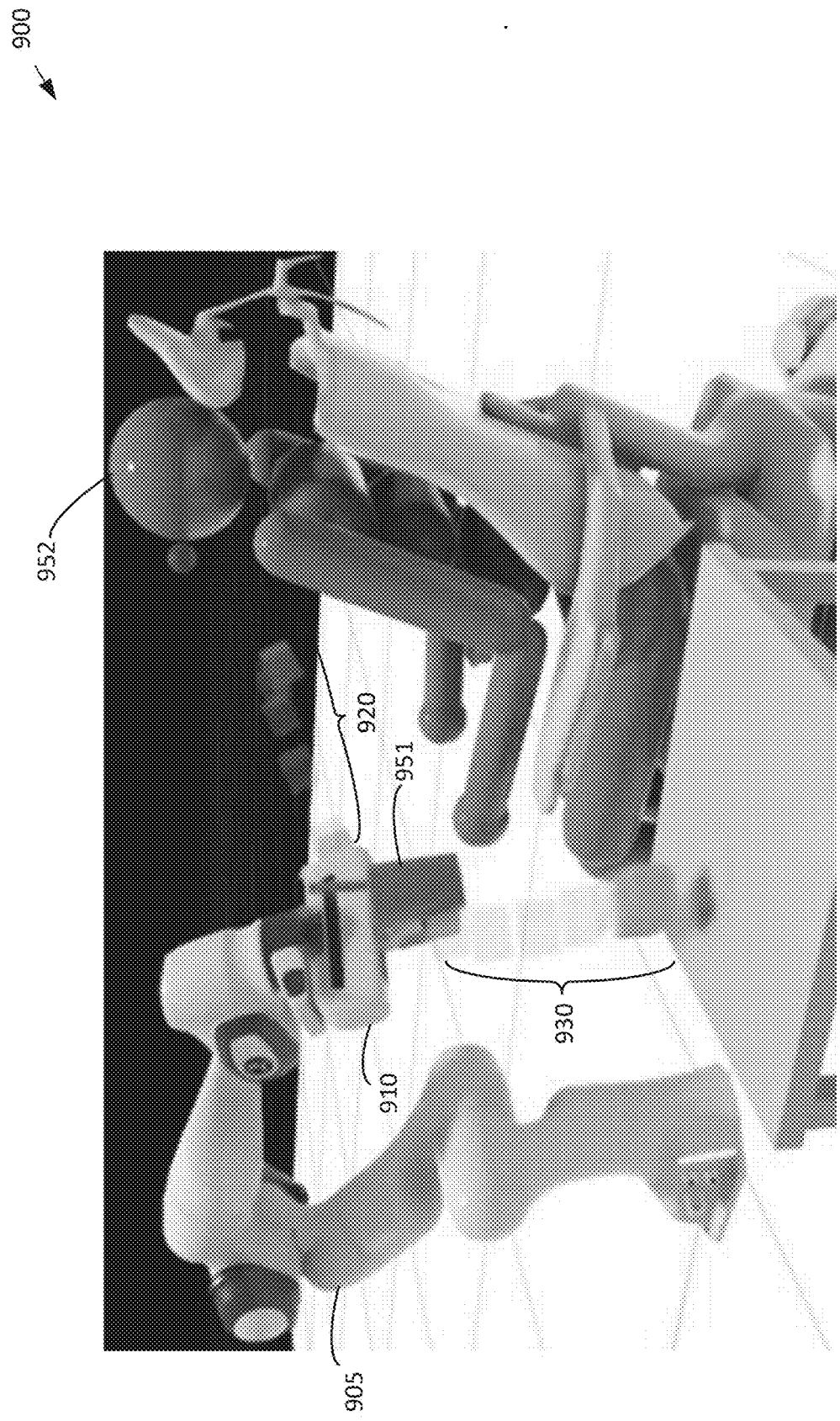
FIG. 9 illustrates a trajectory forecast associated with a household task performed by a fourth simulated robot, according to various embodiments.

FIG. 9 illustrates a trajectory forecast associated with a household task performed by a fourth simulated robot, according to various embodiments. In some embodiments, the robot task demonstrations 150 include demonstrations of personal caregiving tasks, such as drink assistance, massaging, scratching, and the like. As shown, a robot task demonstration performed in a virtual environment 900 comprises a demonstration of a fourth simulated robot 905 having a fourth robot end-effector 910 performing a drink assistance task on a first object 951 (representing a cup) and a second object 952 (representing a human) in the virtual environment 900. The simulator 125 generates a trajectory forecast 920 that graphically illustrates the pose of the fourth robot end-effector 910 during a sequence of future time-steps. Based on the trajectory forecast 920, the user can decide to set the simulator 125 to manual mode to manually control the simulated robot 905 (via the VR controller 172), and then return the simulator 125 to automatic mode. The simulator 125 also generates a past trajectory 930 that graphically illustrates the pose of the fourth robot end-effector 910 during a previous sequence of past time-steps.

The simulator 125 is referred to as operating in "auto-assistive mode" when a combination of automatic and manual modes are used to operate the simulated robot to successfully complete the specific task. A successful robot task demonstration comprises a robot task demonstration wherein the simulated robot has successfully performed the specific task within a predetermined time period. When the specific task is completed entirely in the automatic mode of the simulator 125, the specialized transformer can be implemented to generate a robot task demonstration with a high rate of success. When the specific task is completed in the auto-assistive mode of the simulator 125, the specialized transformer can be implemented to generate a robot task demonstration with an even higher rate of success than when performed entirely in automatic mode. In this manner, the execution technique provides automated operation and/or auto-assistive operation of the simulated robot in successfully performing the task that requires no amount or a small amount of manual operation by the user relative to conventional techniques.

As the simulated robot performs the particular task in the simulated environment (either in automatic mode or auto-assistive mode), the simulator 125 records demonstration data describing the performance of the particular task in the simulated environment that is then included in a new robot task demonstration 150 for the particular task. In some embodiments, the simulator 125 records data describing an entire sequence of end-effector poses, end-effector grip status, and object poses for at least one object during the completed performance of the particular task, which is included in the new robot task demonstration 150 for the particular task. In other embodiments, the simulator 125 records other data describing the performance of the particular task in the simulated environment that is included in the new robot task demonstration 150. Each new robot task demonstration 150 can then be stored to a database or datastore, such as the storage 114.

Figure 10:
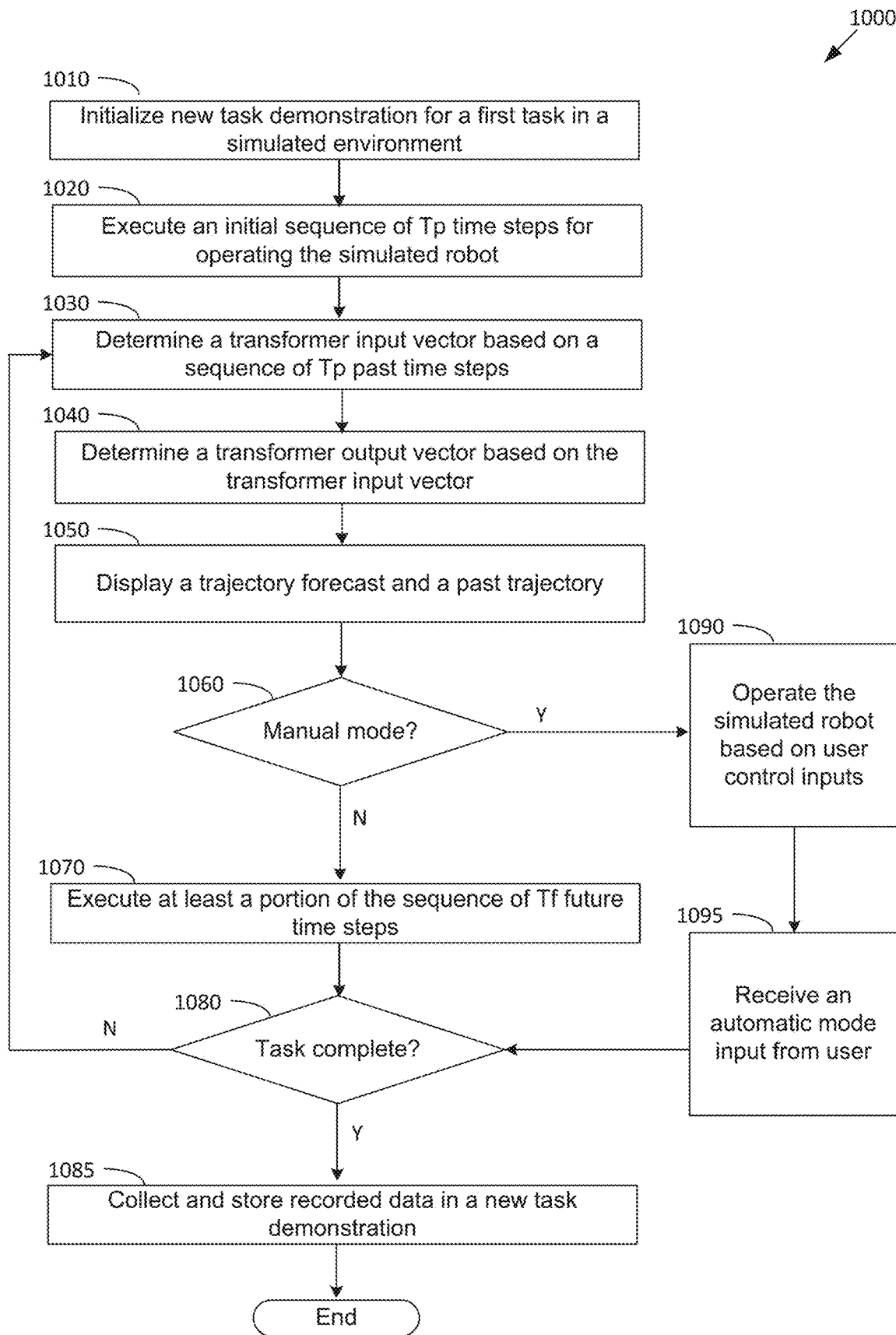
FIG. 10 is a flow diagram of method steps for generating task demonstrations using a transformer, according to various embodiments.

FIG. 10 is a flow diagram of method steps for generating task demonstrations using a transformer, according to various embodiments. Although the method steps are described in conjunction with the systems of FIGS. 1-2 and 5 9, persons skilled in the art will understand that any system configured to perform the method steps in any order falls within the scope of the present disclosure. In some embodiments, the method 1000 is executed by a simulator 125 in conjunction with an execution engine 124 that executes a specialized transformer (such as transformer 200) that is trained for a first task.

As shown, at step 1010, the simulator 125 initializes a new task demonstration for the first task in a simulated environment. To do so, the simulator 125 configures and generates a simulated robot based on a set of robot configuration parameters 130. For the first task, it is desirable to generate different new task demonstrations that vary. In this regard, the simulator 125 can determine a different initial state of the simulated environment for different task demonstrations by randomly varying the initial pose of the end-effector, initial grip status of the end-effector, and/or the initial pose of at least one object within the simulated environment. For example, the simulator 125 can determine an initial pose of the end-effector, an initial grip status of the end-effector, and an initial pose of at least one object using a standard random function, or any other suitable technique.

At step 1010, the simulator 125 also displays the simulated environment including the simulated robot and at least one object throughout the execution of the method 1000, for example, via a VR headset 171. The simulator 125 also begins recording data describing the performance of the first task by the simulated robot that is then included in the new robot task demonstration 150 for the first task. For example, the simulator 125 can record data describing an entire sequence of end-effector poses, end-effector grip statuses, and object poses during the entire completed performance of the first task. The simulator 125 is also initially set to automatic mode.

At step 1020, the simulator 125 determines and executes an initial sequence of Tp time steps for operating the simulated robot in performing the first task. The initial sequence of Tp time steps is determined based on the initial state of the simulated environment. For example, the simulator 125 can derive initial input information describing the initial state of the environment with the action vectors being set to zero, input the initial input information to the specialized transformer to receive a prediction from the specialized transformer, concatenate the prediction with previous state and action vectors, and repeat until the initial sequence of Tp time steps is determined. The simulator 125 then executes the initial sequence of Tp time steps for operating the simulated robot.

At step 1030, the simulator 125 determines a transformer input vector 225 based on a sequence of Tp past time steps that were most recently executed (either in automatic mode or in manual mode). The transformer input vector 225 includes transformer input information for a most recent sequence of Tp past time steps that the simulator 125 can derive from the simulated environment. The transformer input information includes a state vector, an action vector, and a positional vector for each past time step. A state vector specifies states of a pose of the robot end-effector, a status of the end-effector grip, and a pose of at least one object in the simulated environment. An action vector specifies actions of a target pose of the robot end-effector and a target status of the end-effector grip in the simulated environment. A positional vector specifies a distance and rotation that the robot end-effector traversed during the time step in the simulated environment.

At step 1040, the simulator 125 determines a transformer output vector 250 based on the transformer input vector 225 by inputting the transformer input vector 225 to the specialized transformer and receiving the transformer output vector 250 from the specialized transformer. In particular, the simulator 125 can transmit the transformer input vector 225 to the execution engine 124, which executes the specialized transformer based on the transformer input vector 225. The specialized transformer generates the transformer output vector 250 based on the transformer input vector 225, and the execution engine 124 transmits the transformer output vector 250 to the simulator 125. The transformer output vector 250 includes transformer output information for a sequence of Tf future time steps that occurs just after the most recent sequence of Tp past time steps. The transformer output information includes a state vector and an action vector for each future time step.

At step 1050, the simulator 125 generates and displays a forecast trajectory and a past trajectory in the simulated environment, for example, via the VR headset 171. The trajectory forecast graphically illustrates the sequence of Tf future time-steps specified in the transformer output vector 250. In particular, the trajectory forecast 620 graphically illustrates the pose of the robot end-effector during the sequence of Tf future time-steps. In some embodiments, the trajectory forecast 620 includes a first sub-portion of the trajectory forecast 621 with a first appearance and a second sub-portion of the trajectory forecast 622 with a second appearance. The first sub-portion of the trajectory forecast 621 graphically represents a first sub-portion of future time steps 510 that are currently executing. The second sub-portion of the trajectory forecast 621 graphically represents a second sub-portion of future time steps 520 that are not currently executing. The simulator 125 can also generate a past trajectory 630 with a third appearance that graphically represents the sequences of past time-steps that have already been executed by the simulator 125. In particular, the past trajectory 630 graphically illustrates the pose of the robot end-effector during a sequence of past time-steps.

At step 1060, the simulator 125 determines if a manual mode input is received from a user, for example, via a VR controller 172. If a manual mode input is received (at 1060-Yes), the method 1000 continues at step 1090. If a manual mode input is not received (at 1060-No), the method 1000 continues at step 1070.

At step 1070, the simulator 125 executes at least a portion of the sequence of Tf future time steps to automatically operate the simulated robot. In some embodiments, the simulator 125 executes the sequence of Te future time steps. In particular, for each such future time step, the simulator 125 operates the simulated robot in a suitable manner (such as using RMP) to achieve the pose of the robot end-effector and the status of the end-effector grip specified in the transformer output information for the future time step. Once executed, a future time step is included in a next sequence of Tp past time steps that is represented by the transformer input vector 225 received by the specialized transformer in the next execution pass/iteration of the specialized transformer.

At step 1080, the simulator 125 determines if the simulated robot has successfully completed the first task. If the first task is not successfully completed (at 1080-No), the method 1000 continues at step 1030. If the first task is successfully completed (at 1080-Yes), the method 1000 continues at step 1085. At step 1085, the simulator 125 collects the recorded data for the performance of the first task and includes the recorded demonstration data in a new task demonstration 150 for the first task. The new task demonstration 150 can be stored in a database or datastore, such as the storage 114. The method 1000 then ends.

If a manual mode input is received (at 1060-Yes), at step 1090, the simulator 125 does not execute at least a portion of the sequence of Tf future time steps, such as the second sub-portion of future time steps 520 that are not currently executing. Rather, the simulator 125 operates the simulated robot for a manual sequence of time steps based on user control inputs received from the user, for example, via the VR controller 172. While in manual mode, the simulator 125 collects manual-mode transformer input information for the manual sequence of time steps. At step 1095, the simulator 125 receives an automatic mode input from the user (via the VR controller 172), which sets the simulator 125 back to automatic mode. The method 1000 then continues at step 1080.

In sum, a training technique is implemented for training a transformer for operating a simulated robot (in conjunction with a simulator) to perform a task associated with at least one object in a simulated environment using robot task demonstrations. The simulated robot includes an end-effector for interacting with the at least one object when performing the task. The training technique includes training the transformer based on the poses of the robot end-effector and the poses of the at least one object exhibited in the robot task demonstrations.

Each robot task demonstration comprises an overall sequence of time steps comprising all time steps for performing a task. During training using a robot task demonstration, a transformer input vector is received by the transformer comprising transformer input information for a sequence of past time steps contained in the overall sequence of time steps of the robot task demonstration. For each past time step, the transformer input information includes a state vector and an action vector. A state vector specifies a pose of the robot end-effector, a status of the end-effector grip, and a pose of at least one object associated with the past time step. An action vector specifies a target pose of the robot end-effector and a target status of the end-effector grip associated with the past time step. Using the robot task demonstrations, the transformer is trained to generate a transformer output vector comprising transformer output information for a sequence of predicted/future time steps based on the transformer input vector. For each future time step, the transformer output information includes a state vector and an action vector.

One technical advantage of the disclosed techniques relative to the prior art is that, with the disclosed techniques, a neural network for operating a simulated robot to perform a task is trained based on the pose (position and orientation) of the robot end-effector exhibited in robot task demonstrations of the task. With the disclosed techniques, the neural network is not trained based on any configuration parameters of the simulator and/or the simulated robot associated with the robot task demonstrations. As a result, the robot task demonstrations (training dataset) used for training the neural network can be generated using any type of simulator and/or any type of simulated robot. Accordingly, the disclosed techniques allow robot task demonstrations for training a neural network to be generated and collected more easily and efficiently than conventional techniques. These technical advantages provide one or more technological improvements over prior art approaches.

In sum, an execution technique is implemented when executing a specialized transformer trained for a specific task to collect new/additional robot task demonstrations for the specific task in a simulated environment. A simulator implements the trained specialized transformer for automatically operating a simulated robot to perform the specific task to generate a robot demonstration of the specific task. When generating a robot task demonstration, the specialized transformer receives a transformer input vector comprising transformer input information for a sequence of past time steps that are already executed in the robot task demonstration. For each past time step, the transformer input information includes a state vector, an action vector, and a positional vector. A positional vector specifies a distance and rotation that the robot end-effector traversed during a past time step.

Based on the transformer input vector, the specialized transformer generates a transformer output vector comprising transformer output information for a sequence of predicted/future time steps that are not yet executed/completed in the robot task demonstration. For each future time step, the transformer output information includes a state vector and an action vector. The simulator receives the transformer output vector from the specialized transformer and executes the sequence of future time steps by operating the simulated robot based on the transformer output information for the sequence of future time steps. The simulator can implement multiple execution passes/iterations of the specialized transformer to automatically operate the simulated robot to complete the performing of the specific task.

The simulator can also operate in manual mode when operating the simulated robot based on user control inputs instead of the transformer output vectors of the specialized transformer. In these embodiments, when the simulator receives the transformer output vector from the specialized transformer, the simulator also displays a trajectory forecast comprising a graphical representation of the sequence of future time-steps specified in the transformer output vector. In particular, the trajectory forecast graphically illustrates the poses of the robot end-effector during the sequence of future time-steps. Based on the trajectory forecast, the user can set the simulator to manual mode to momentarily intervene and stop the automatic mode operation of the simulated robot. After the user believes the simulated robot is back on the correct track for successfully performing the task, the user can set the simulator back to automatic mode to continue automatic operation of the simulated robot based on the outputs of the specialized transformer instead of the user control inputs, for example, to complete the task.

One technical advantage of the disclosed techniques relative to the prior art is that, with the disclosed techniques, a simulator implements a trained neural network for automatically operating a simulated robot to perform a task for generating a robot demonstration of the task. Another technical advantage of the disclosed techniques relative to the prior art is that, with the disclosed techniques, the simulator displays a trajectory forecast that graphically illustrates the poses of the robot end-effector during the sequence of future time-steps. Based on the trajectory forecast, the user can decide to interrupt the automatic operation of the simulated robot and momentarily provide user inputs for manually operating the simulated robot, and then allow the automatic operation of the simulated robot to resume for completing the task. In this manner, the disclosed techniques provide automated operation and/or auto-assistive operation of the simulated robot in performing the task that requires no amount or a small amount of manual operation by the user. Accordingly, the disclosed techniques allow robot task demonstrations for training a neural network to be generated and collected more easily and efficiently than conventional manual techniques. These technical advantages provide one or more technological improvements over prior art approaches.

Aspects of the subject matter described herein are set out in the following numbered clauses.

1. In some embodiments, a computer-implemented method for generating a robot task demonstration, the method comprising: generating, via a simulator engine, a simulated environment that includes a robot and at least one object; causing the robot to at least partially perform a task associated with the at least one object within the simulated environment based on a first output vector generated by a trained neural network; and recording demonstration data of the robot at least partially performing the task within the simulated environment.

2. The computer-implemented method of clause 1, wherein the first output vector specifies a sequence of future poses of an end-effector of the robot and is generated by the trained neural network based on a first input vector that specifies a sequence of past poses of the end-effector of the robot.

3. The computer-implemented method of any of clauses 1-2, wherein causing the robot to at least partially perform the task comprises causing the robot to perform a sequence of future poses of an end-effector specified in the first output vector.

4. The computer-implemented method of any of clauses 1-3, further comprising: receiving, at the simulator engine, a second output vector generated by the trained neural network, wherein the second output vector specifies a sequence of future poses of an end-effector of the robot; and displaying a trajectory forecast within the simulated environment, wherein the trajectory forecast comprises a graphical representation of the sequence of future poses of the end-effector.

5. The computer-implemented method of any of clauses 1-4, further comprising: receiving a first user input that causes the simulator engine to enter into a manual mode; and in response, causing the robot to at least partially perform the task based on one or more user control inputs.

6. The computer-implemented method of any of clauses 1-5, further comprising recording additional demonstration data of the robot at least partially performing the task based on the one or more user control inputs.

7. The computer-implemented method of any of clauses 1-6, wherein the simulated environment comprises a virtual reality (VR) environment, the VR environment is displayed via a VR headset, and the one or more user control inputs are received via a VR controller.

8. The computer-implemented method of any of clauses 1-7, further comprising: receiving a second user input that causes the simulator engine to enter into an automatic mode; and in response, causing the robot to at least partially perform the task automatically based on a third output vector generated by the trained neural network.

9. The computer-implemented method of any of clauses 1-8, wherein the third output vector is generated by the trained neural network based on an input vector that specifies a sequence of past poses of an end-effector of the robot when the robot was at least partially performing the task based on the one or more user control inputs.

10. The computer-implemented method of any of clauses 1-9, further comprising: receiving, at the simulator engine, a second output vector generated by the trained neural network, wherein the second output vector specifies a sequence of future poses of an end-effector of the robot; displaying a trajectory forecast within the simulated environment, wherein the trajectory forecast comprises a graphical representation of the sequence of future poses of the end-effector; and displaying a past trajectory in the simulated environment comprising a graphical representation of a sequence of past poses of the end-effector, wherein the past trajectory is displayed with a different appearance than the trajectory forecast.

11. In some embodiments, one or more non-transitory computer readable media storing instructions that, when executed by one or more processors, cause the one or more processors to generate a robot task demonstration by performing the steps of: generating, via a simulator engine, a simulated environment that includes a robot and at least one object; causing the robot to at least partially perform a task associated with the at least one object within the simulated environment based on a first output vector generated by a trained neural network; and recording demonstration data of the robot at least partially performing the task within the simulated environment.

12. The one or more non-transitory computer readable media of clause 11, wherein the first output vector specifies a sequence of future poses of an end-effector of the robot, further comprising: before causing the robot to at least partially perform the task, displaying a trajectory forecast within the simulated environment, wherein the trajectory forecast comprises a graphical representation of the sequence of future poses of the end-effector.

13. The one or more non-transitory computer readable media of any of clauses 11-12, further comprising: causing the robot to complete performance of the task based on a plurality of output vectors generated by the trained neural network; and recording additional demonstration data of the robot completing performance of the task within the simulated environment.

14. The one or more non-transitory computer readable media of any of clauses 11-13, wherein the first output vector specifies a sequence of future poses of an end-effector of the robot and is generated by the trained neural network based on a first input vector that specifies a sequence of past poses of the end-effector of the robot.

15. The one or more non-transitory computer readable media of any of clauses 11-14, further comprising: receiving, at the simulator engine, a second output vector generated by the trained neural network, wherein the second output vector specifies a sequence of future poses of an end-effector of the robot; and displaying a trajectory forecast within the simulated environment, wherein the trajectory forecast comprises a graphical representation of the sequence of future poses of the end-effector.

16. The one or more non-transitory computer readable media of any of clauses 11-15, further comprising: receiving a first user input that causes the simulator engine to enter into a manual mode; and in response to the first user input, not operating the robot based on the second output vector.

17. The one or more non-transitory computer readable media of any of clauses 11-16, further comprising: receiving a first user input that causes the simulator engine to enter into a manual mode; and in response to the first user input, causing the robot to at least partially perform the task based on one or more user control inputs.

18. The one or more non-transitory computer readable media of any of clauses 11-17, further comprising recording additional demonstration data of the robot at least partially performing the task based on the one or more user control inputs.

19. The one or more non-transitory computer readable media of any of clauses 11-18, further comprising: receiving a second user input that causes the simulator engine to enter into an automatic mode; and in response, causing the robot to at least partially perform the task based on a third output vector generated by the trained neural network.

20. In some embodiments, a system, comprising: one or more memories that store instructions, and one or more processors that are coupled to the one or more memories and, upon executing the instructions, generate a robot task demonstration by performing the steps of: generating, via a simulator engine, a simulated environment that includes a robot and at least one object; causing the robot to at least partially perform a task associated with the at least one object within the simulated environment based on a first output vector generated by a trained neural network; and recording demonstration data of the robot at least partially performing the task within the simulated environment.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a robot task demonstration, the method comprising:
    generating, via a simulator engine, a simulated environment that includes a robot and at least one object;
    causing the robot to at least partially perform a task associated with the at least one object within the simulated environment based on a first output vector that is generated by a trained neural network in response to a first input vector that specifies a sequence of past poses of an end-effector of the robot within the simulated environment; and
    recording demonstration data of the robot at least partially performing the task within the simulated environment.

2. The computer-implemented method of claim 1, wherein the first output vector specifies a sequence of future poses of the end-effector of the robot.

3. The computer-implemented method of claim 1, wherein causing the robot to at least partially perform the task comprises causing the robot to perform a sequence of future poses of an end-effector specified in the first output vector.

4. The computer-implemented method of claim 1, further comprising:
    receiving, at the simulator engine, a second output vector generated by the trained neural network, wherein the second output vector specifies a sequence of future poses of an end-effector of the robot; and
    displaying a trajectory forecast within the simulated environment, wherein the trajectory forecast comprises a graphical representation of the sequence of future poses of the end-effector.

5. The computer-implemented method of claim 1, further comprising:
    receiving a first user input that causes the simulator engine to enter into a manual mode; and
    in response, causing the robot to at least partially perform the task based on one or more user control inputs.

6. The computer-implemented method of claim 5, further comprising recording additional demonstration data of the robot at least partially performing the task based on the one or more user control inputs.

7. The computer-implemented method of claim 5, wherein the simulated environment comprises a virtual reality (VR) environment, the VR environment is displayed via a VR headset, and the one or more user control inputs are received via a VR controller.

8. The computer-implemented method of claim 5, further comprising:
    receiving a second user input that causes the simulator engine to enter into an automatic mode; and
    in response, causing the robot to at least partially perform the task automatically based on a third output vector generated by the trained neural network.

9. The computer-implemented method of claim 8, wherein the third output vector is generated by the trained neural network based on an input vector that specifies a sequence of past poses of an end-effector of the robot when the robot was at least partially performing the task based on the one or more user control inputs.

10. The computer-implemented method of claim 1, further comprising:
    receiving, at the simulator engine, a second output vector generated by the trained neural network, wherein the second output vector specifies a sequence of future poses of an end-effector of the robot;
    displaying a trajectory forecast within the simulated environment, wherein the trajectory forecast comprises a graphical representation of the sequence of future poses of the end-effector; and
    displaying a past trajectory in the simulated environment comprising a graphical representation of a sequence of past poses of the end-effector, wherein the past trajectory is displayed with a different appearance than the trajectory forecast.

11. One or more non-transitory computer readable media storing instructions that, when executed by one or more processors, cause the one or more processors to generate a robot task demonstration by performing the steps of:
    generating, via a simulator engine, a simulated environment that includes a robot and at least one object;
    causing the robot to at least partially perform a task associated with the at least one object within the simulated environment based on a first output vector that is generated by a trained neural network in response to a first input vector that specifies a sequence of past poses of an end-effector of the robot within the simulated environment; and
    recording demonstration data of the robot at least partially performing the task within the simulated environment.

12. The one or more non-transitory computer readable media of claim 11, wherein the first output vector specifies a sequence of future poses of an end-effector of the robot, further comprising:
    before causing the robot to at least partially perform the task, displaying a trajectory forecast within the simulated environment, wherein the trajectory forecast comprises a graphical representation of the sequence of future poses of the end-effector.

13. The one or more non-transitory computer readable media of claim 11, further comprising:
    causing the robot to complete performance of the task based on a plurality of output vectors generated by the trained neural network; and
    recording additional demonstration data of the robot completing performance of the task within the simulated environment.

14. The one or more non-transitory computer readable media of claim 11, wherein the first output vector specifies a sequence of future poses of the end-effector of the robot.

15. The one or more non-transitory computer readable media of claim 11, further comprising:
    receiving, at the simulator engine, a second output vector generated by the trained neural network, wherein the second output vector specifies a sequence of future poses of an end-effector of the robot; and displaying a trajectory forecast within the simulated environment, wherein the trajectory forecast comprises a graphical representation of the sequence of future poses of the end-effector.

16. The one or more non-transitory computer readable media of claim 15, further comprising:
receiving a first user input that causes the simulator engine to enter into a manual mode; and
in response to the first user input, not operating the robot based on the second output vector.

17. The one or more non-transitory computer readable media of claim 11, further comprising:
receiving a first user input that causes the simulator engine to enter into a manual mode; and
in response to the first user input, causing the robot to at least partially perform the task based on one or more user control inputs.

18. The one or more non-transitory computer readable media of claim 17, further comprising recording additional demonstration data of the robot at least partially performing the task based on the one or more user control inputs.

19. The one or more non-transitory computer readable media of claim 17, further comprising:
receiving a second user input that causes the simulator engine to enter into an automatic mode; and
in response, causing the robot to at least partially perform the task based on a third output vector generated by the trained neural network.

20. A system, comprising:
one or more memories that store instructions, and
one or more processors that are coupled to the one or more memories and, upon executing the instructions, generate a robot task demonstration by performing the steps of:
generating, via a simulator engine, a simulated environment that includes a robot and at least one object;
causing the robot to at least partially perform a task associated with the at least one object within the simulated environment based on a first output vector that is generated by a trained neural network in response to a first input vector that specifies a sequence of past poses of an end-effector of the robot within the simulated environment; and
recording demonstration data of the robot at least partially performing the task within the simulated environment.

* * * * *